US010373172B2

(12) United States Patent
Choueifaty et al.

(10) Patent No.: US 10,373,172 B2
(45) Date of Patent: Aug. 6, 2019

(54) SYSTEM AND METHOD FOR USE IN CONNECTION WITH POLLUTANT EMISSIONS

(71) Applicant: CHOHOL, Paris (FR)

(72) Inventors: Yves Choueifaty, Neuilly sur Seine (FR); Fabien Carimalo, Rueil-Malmaison (FR); Valérie Mas, Villennes-sur-Seine (FR)

(73) Assignee: CHOHOL, Paris (FR)

( * ) Notice: Subject to any disclaimer, the term of this patent is extended or adjusted under 35 U.S.C. 154(b) by 73 days.

(21) Appl. No.: 15/556,202

(22) PCT Filed: Mar. 9, 2016

(86) PCT No.: PCT/IB2016/051345
§ 371 (c)(1),
(2) Date: Sep. 6, 2017

(87) PCT Pub. No.: WO2016/142887
PCT Pub. Date: Sep. 15, 2016

(65) Prior Publication Data
US 2018/0039995 A1      Feb. 8, 2018

(30) Foreign Application Priority Data

Mar. 9, 2015   (WO) .................. PCT/IB2015/000532

(51) Int. Cl.
*G06Q 30/00* (2012.01)
*G06Q 10/04* (2012.01)
(Continued)

(52) U.S. Cl.
CPC ........... *G06Q 30/018* (2013.01); *G06Q 10/04* (2013.01); *G06Q 10/06* (2013.01); *G06Q 20/40* (2013.01);
(Continued)

(58) Field of Classification Search
USPC ................. 705/44, 37, 39, 41, 38; 701/32.6; 702/182; 423/212
See application file for complete search history.

(56) References Cited

U.S. PATENT DOCUMENTS 6,601,033 B1      7/2003  Sowinski
6,952,641 B2 *   10/2005  DiDomenico ........... G08G 1/01
                                                        701/102
(Continued)

OTHER PUBLICATIONS

International Search Report dated Sep. 8, 2015.

*Primary Examiner* — Tien C Nguyen
(74) *Attorney, Agent, or Firm* — Ipsilon USA, LLP

(57) ABSTRACT

The invention concerns a method for incentivizing management or reduction of emission of one or more pollutants in connection with operation of a pollutant-emitting device, characterized in that the method comprises:
 transmitting an offset status information signal to at least one information system during operation of a pollutant-emitting device, and
 causing said at least one information system to indicate, in response to receiving said offset status information signal, whether a pollution-offset procedure has been implemented in a pollutant offset program for offsetting in a certified or certifiable manner at least part of the quantity of pollutant(s) emitted by the device.

42 Claims, 10 Drawing Sheets

(51) Int. Cl.
*G06Q 10/06* (2012.01)
*G06Q 20/40* (2012.01)
*G06Q 20/28* (2012.01)

(52) U.S. Cl.
CPC .............. *G06Q 20/28* (2013.01); *Y02P 90/84* (2015.11); *Y02P 90/845* (2015.11)

(56) References Cited

U.S. PATENT DOCUMENTS

| | | | | |
|---|---|---|---|---|
| 6,983,639 B1* | 1/2006 | DiDomenico | ......... | G01N 21/33 73/23.31 |
| 7,343,341 B2* | 3/2008 | Sandor | ................... | G06Q 30/08 705/37 |
| 8,478,566 B2* | 7/2013 | Glenn | ................... | G06Q 10/06 702/182 |
| 8,647,596 B1* | 2/2014 | Hyde | ........................ | F01N 3/10 423/212 |
| 9,097,614 B2* | 8/2015 | Cardoso | .............. | G01M 15/102 |
| 9,098,076 B2* | 8/2015 | Kubota | ................. | G05B 15/02 |
| 2005/0197794 A1* | 9/2005 | Full | ...................... | G01N 21/274 702/100 |
| 2007/0255461 A1* | 11/2007 | Brickfield | ............... | H02J 3/008 700/295 |
| 2007/0263213 A1* | 11/2007 | Stedman | ................... | G01J 3/02 356/328 |
| 2010/0070316 A1 | 3/2010 | Lieberman et al. | | |
| 2010/0262313 A1* | 10/2010 | Chambers | .............. | G05B 15/02 700/295 |
| 2011/0060476 A1* | 3/2011 | Iino | ........................... | H02J 3/14 700/297 |
| 2013/0155001 A1* | 6/2013 | Yilmaz | ................... | G06F 3/044 345/174 |
| 2013/0218446 A1 | 8/2013 | Bradley et al. | | |

* cited by examiner

SYSTEM AND METHOD FOR USE IN CONNECTION WITH POLLUTANT EMISSIONS

RELATED APPLICATION

This application is a National Phase of PCT/IB2016/051345, filed on Mar. 9, 2016 which in turn claims the benefit of priority from International Patent Application No. PCT/IB2015/000532, filed on Mar. 9, 2015, the entirety of which are incorporated by reference.

BACKGROUND

Field of the Invention

The present invention relates to systems and methods for incentivizing management and/or reduction of pollutant emissions in connection with operation of a pollution emitting device or process.

DESCRIPTION OF RELATED ART

It is known that voluntary actors worldwide channeled their personal or corporate financial resources into carbon reduction projects. Such projects may reflect the full spectrum of the actor's climate footprint by supporting activities that deliver positive benefits "beyond carbon" and that are in line with their environmental impacts and vulnerabilities. Voluntary actors contracted 101 million tons of carbon offsets (Mt $CO_2e$) for immediate or future delivery in 2012. Suppliers predict market value could reach $1.6-$2.3 billion in 2020—if market actors can effectively communicate the relevance of offsetting and carbon market infrastructure to private sector actors, the international donor community, and governments seeking tools to incentivize, verify, and finance climate action.

It also is known from WO2014/046782 a method and a system for purchasing carbon emission credits at a fuel dispensing station via a portable computing device. According to this document a user buys carbon emission credits via the portable computing device when refueling his vehicle at the fuel station. No association is made between any offsetting protocol and actual operation of a vehicle.

Car manufacturers invest to improve people's awareness about climate change and greenhouse gas (GHG) emissions. These investments include efforts to reduce fuel consumption in a theoretical manner, which typically is calculated according to the New European Driving Cycle (NEDC) standard protocol. However, actual conditions of vehicle use, as well as any user efforts to be efficient in a global and sustainable view, have not adequately been taken into account.

For instance, and despite important efforts made in Europe on g $CO_2$/km reductions by car manufacturers, real levels of emissions are higher than those promoted by car manufacturers according to a study made by The International Council for Clean Transportation. That study reveals that the average difference between official and actual consumption figures rose from 8% in 2001 to 31% in 2013 for all the vehicles in Europe including company and passengers cars. The NEDC standard protocol should give way in 2017 to a WLTP standard (Worldwide Harmonized Light Duty Test Procedures) that is intended to be more in line with the reality of driving every day.

OBJECTS AND SUMMARY

Accordingly, there is a need for an improved system and method for managing the emission of $CO_2$ and other pollutants in connection with the actual operation of a pollutant emitting device or process.

An embodiment of the invention described herein provides a system and method for incentivizing management or reduction of emission of greenhouse gases (GHG) and/or other pollutants produced by the consumption of fuel in a device or process.

Another embodiment of the invention provides a system and method for incentivizing management or reduction of one or more pollutants produced by or in connection with the operation of a pollution-emitting device or process. Still another embodiment of the invention provides a system and method for incentivizing management or reduction of emission of water pollutants by a device or process that utilizes water.

It will be understood that incentivizing management or reduction of emission of one or more pollutants encompasses any activity which causes or promotes a net-positive effect on overall pollutant emission, including but not limited to the purchase and/or implementation of a certified pollution offsetting protocol, behavior modification with regard to a user or operator of a pollution-emitting device or process, or incentivization of individuals or entities with regard to pollution-reducing activities.

In one embodiment, a system and method for incentivizing management or reduction of emission of one or more pollutants produced by or in connection with the operation of a pollution-emitting device or process comprises:
causing automatically, i.e. without any direct human intervention, at least one information system to emit/transmit information during the operation of the device, said emitted information being representative of whether a pollution-offset procedure has been implemented for offsetting in a certified or certifiable manner at least part of the quantity of pollutant(s) emitted by the device.

Thus in association with the operation of the pollution-emitting device or process that utilizes a primary product, such as fuel or water, and emits pollutants, such as GHG or polluted water, the system and method of the invention causes in real time the conveyance or emission or transmission of information representative of the fact that a pollutant offset program has been funded or not. Such conveyance or emission or transmission of information may be caused to occur, without any direct human intervention. The conveyance or emission or transmission of information may be caused to occur automatically when receiving a signal (e.g. an offset or non-offset status information signal).

Making it known in real time (during the operation of the pollutant-emitting device or process and optionally based on the actual or estimated amount of the emission), under various forms of media or modes of communication or communication networks, whether the device is involved in a certified pollutant offset program may have a significant influence on current and/or future behavior. By way of example only, real time communication of such representative information to a user or operator of the device or process can affect that user or operator's current and/or future behavior with regard to the manner in which the device or process is operated. Communication of such representative information in a manner that is visible or perceivable by the public can similarly affect their current and/or future behavior. For example, members of the public may selectively opt to utilize services of providers for which the communicated representative information indicates that the provider is operating within a pollution offset program.

In order to enhance the awareness of any consumer or entity about his/her/its responsibility for GHG emissions, entering into/activating the offset process takes place where and in some instances when GHGs are emitted. For instance, when the device is a car the present invention may provide a user with information such as actual g $CO_2$/km emitted per day, per travel or per year, for instance. This also can be a tool to control GHG emissions based on driving habits and therefore to change driving habits.

In one embodiment, the payment procedure for buying offset emission is performed or activated in real time during the operation of the device or process, and linked to actual use of the device or process, the consumption of fuel or utilization of water (or more generally, the consumption or utilization of a primary product), and the emission of pollutants (GHG and/or water pollutants, and more generally pollutants) by the device or process.

In another embodiment, the system can be selectively set at any time, for example by the device user, to implement an offset of emissions from the device. Thus, a system and method as described herein may be utilized independent from fuel supply networks and specially-equipped fuel pumps.

According to another embodiment of the invention an embedded offsetting device may be located on board a vehicle or, more generally, in the pollutant-emitting device or in association therewith.

According to still another embodiment, the invention concerns a method that comprises transmitting an offset status information signal to at least one information system during operation of a pollutant-emitting device or process, and causing said at least one information system to indicate, in response to receiving said offset status information signal, whether a pollution-offset procedure has been implemented in a pollutant offset program for offsetting in a certified or certifiable manner at least part of the quantity of pollutant(s) emitted by the device or process; indicating whether a pollution-offset procedure has been implemented may take the form of emitting or communicating or transmitting information during operation of the pollutant-emitting device or process, said emitted or communicated information being representative of whether a pollution-offset procedure has been implemented; the offset status information signal may depend on a selected or designated offset factor which defines an offset rate for offsetting within the frame of the pollutant offset program;

A more particular embodiment of the invention concerns a method for incentivizing management or reduction of emission of one or more pollutants in connection with operation of a pollutant-emitting device, characterized in that the method comprises the following steps performed automatically, i.e. without direct human intervention, when the pollutant-emitting device is in operation:

detecting operation of the device, checking whether the detected device under operation is the pollutant-emitting device associated with a subscriber's account that has been previously registered by a subscriber for subscribing to a pollutant offset program for offsetting in a certified or certifiable manner at least part of the quantity of pollutant(s) emitted by the device, when the result of the checking step is positive, generating an offset or non-offset status electronic signal, said signal including:

identification information identifying the detected device under operation, pollutant offset information regarding a selected operation mode for operating the device either under a pollutant offset mode or a pollutant non-offset mode of the pollutant offset program, the selected operation mode for operating the device under a pollutant offset mode being representative of a pollution-offset procedure that has been implemented in the pollutant offset program, time information representing time at which the device has been detected as operated, transmitting said generated offset or non-offset status electronic signal to at least one information system via a wireless communication network, activating the at least one information system from information contained in the transmitted generated offset or non-offset status electronic signal so that said system transmits offset incentivization information in real time during operation of the device, said transmitted offset incentivization information indicating whether a pollution-offset procedure has been implemented or not in the pollutant offset program for offsetting in a certified or certifiable manner at least part of the quantity of pollutant(s) currently emitted by the device under operation.

The above embodiment establishes a closed machine-to-machine loop that ensures security of the incentivization method. When the device has been automatically (i.e. without any human intervention) detected as being under operation the following step aims at checking that this device is the same as the one that has been previously registered within the frame of a pollutant offset program in association with a registered subscription or subscriber account. This check is also performed automatically.

When the result of the check proves that the device under operation is the same as the one associated with the previously registered subscription or subscriber account an offset or non-offset status electronic signal may be automatically generated and transmitted to the at least one information system. This signal has a function of control on the at least one information system, more particularly on the activation or triggering of the transmission of information. When this signal is received by the at least one information system it causes transmission by the latter (automatically) of offset incentivization information in real time during operation of the device.

This status signal uniquely identifies the device and its selected offset (or non-offset) mode in relation with the actual consumption (and pollution) of the device. This status signal is transmitted in real time during operation of the device and cannot be forged. The different types of information contained in the signal clearly identify the device, its way of offsetting and current time or instant at which the device is under operation.

Thus, detection of operation of the device and check of the identity of the device (relative to the previously identified/registered device) may automatically lead to transmission of offset incentivization information in real time during operation of the device.

When the device is being operated information is transmitted in real time via different possible media of communication. This information is representative of the fact that the device is involved in a pollutant offset program and is neutralizing (or not) at least part of the quantity of pollutant(s) currently emitted by said device under operation.

The above-mentioned method establishes a secured link between the device and the information according to which it is being operated under an offset or non-offset mode in a pollutant offset program (in other words a unique link can therefore be established between the pollutant-emitting device and a pollution-offset program via a subscribing/subscriber account). If the device has not being recognized as authorized for use in association with the registered subscription or subscriber account, then none transmission of offset incentivization information in real time during operation of the device can occur.

Time information representing time or instant at which the device has been detected as operated may be useful for subsequent authentication purpose. This information makes it possible to ensure that the device is certified as being neutral or partly neutral (or not neutral at all) since the device is started (ex: on the current path of the device if it is an automobile) thanks to the chain that has just been described. Time information may also be useful for historical purpose for keeping track of different data associated with the current operation of the device (ex: consumption of primary product, quantity of pollutant(s) emitted e.g. on the path, quantity of $CO_2$ offset, etc.).

The detecting, checking, generating and transmitting steps may be performed by at least one sub-system or entity communicating with the device or several sub-systems or entities communicating each or not with the device.

For example, the detecting and checking steps may be performed by a first sub-system (ex: a communicating device or apparatus such as a mobile phone) communicating directly with the device in association with a second sub-system communicating only with the first sub-system. The generating and transmitting steps may be performed by the second sub-system only. It can be envisaged that the transmitting step is carried out once between the first and second sub-systems and then between the second sub-system and the at least one information system. Alternatively, the transmitting step may be carried out directly between the first sub-system and the at least one information system. In another configuration, there is only one sub-system communicating directly with the device and the at least one information system and which performs all the above-mentioned steps.

According to other possible features of any of the above-mentioned embodiments of the invention taken either alone or in combination with each other:
- the method comprises an identification step for identifying the device under operation from the device itself; identification data or information specific to the device may be obtained from the device itself, for example when it is under operation; this step may also be performed automatically;
- the method comprises a further comparison step for comparing the identified device under operation with the device that has been previously registered as authorized for use in association with the subscriber's account;
- this comparison step makes it possible to ensure that the device under operation is the device that has been already registered; this step may also be performed automatically;
- the method comprises a check step for checking the existence of a subscriber's account that has been previously registered by a subscriber for subscribing to a pollutant offset program for offsetting in a certified or certifiable manner at least part of the quantity of pollutant(s) emitted by a pollutant-emitting device; this step may also be performed automatically;
- the method comprises a check step for checking whether any prepayment procedure has been set up when registering the subscriber's account; more generally a check step can be performed to check the payment methods that have been previously selected by the subscriber when registering his/her subscriber's account (ex: prepayment, etc.); a further check step may be performed to check whether the account has been sufficiently funded or whether the prepayment already made is sufficient with respect to a threshold; this step may also be performed automatically; the above identification step, comparison step, subscriber's account check step and prepayment procedure check step may be performed by at least one sub-system or entity communicating with the device or several sub-systems or entities communicating each or not with the device; generally, the identification step necessitates a direct communication between the sub-system and the module, whereas the other steps do not and therefore can be performed by a sub-system that is not in direct communication with the device;
- the selected operation mode for operating the device under a pollutant offset mode including a selected offset rate factor for offsetting at least part of the quantity of pollutant(s) emitted by the device under operation;
- the method comprises a reception step, performed by the at least one information system, for receiving said transmitted generated offset or non-offset status electronic signal;
- the method comprises a storage step for storing said information contained in the offset or non-offset status electronic signal for subsequent authenticity check; this step may be performed by a sub-system that stores said information in its own memory resources or in another sub-system such as an authentication entity provided with memory resources;
- the method comprises a comparison step for comparing subsequent information contained in an electronic signal and that is configured to activate said at least one information system with said stored information and checking authenticity of said compared subsequent information; time information contained in the genuine signal (stored information) is a guarantee of the authenticity of the signal and of the device under operation; such information cannot therefore be forged by a frauder wishing to activate an information system with an unauthorized signal:
- the step for activating the at least one information system from information contained in the transmitted generated offset or non-offset status electronic signal further comprises extracting said information from the signal, processing said extracted information and generating at least one command for activating the at least one information system depending on said information; this step is performed automatically from the reception of the status signal;
- the pollutant-emitting device is an automobile or, more generally, a vehicle;
- operation of the pollutant-emitting device or process causes emission of greenhouse gases (GHG) produced by consumption of fuel;
- the method further comprises determining or estimating an actual quantity of pollutant emitted during said operation of the device or process; this makes it possible to authenticate the emission of pollutant based on the real time consumption of a primary product by the device (during operation of the device);

determining or estimating an actual quantity of pollutant emitted during said operation of the device or process can be performed by:
  measuring the actual consumption of fuel by the device or process and obtaining the quantity of actual pollutant emitted by the device or process based on the measured actual consumption (option A); this option is the most reliable one among the three options A to C since it guarantees the emitted net $CO_2$;
  measuring the actual quantity of pollutant emitted by the device or process (option B); this option is representative of actual combustion of the fuel; or
  estimating the actual quantity of pollutant emitted by the device or process taking into account actual conditions of use of the device or process and technical information related thereto (option C); this option is rather based on empirical data/information; it is to be noted that the method may alternately propose the three options that can be selected depending on circumstances and/or needs, e.g. when one or two options cannot be envisaged for some reasons (e.g. a loss of communication network);

operation of a pollutant-emitting device or process includes operation of a device or process apparatus which causes emission of one or more pollutants in water;

the method may further comprise determining an actual quantity of polluted water or pollutant(s) emitted during operation of the device or process apparatus based on a first quantity of water measured at an input to the device or process apparatus, a second quantity of pollutants added to the water in the device or process apparatus, and a third quantity of water measured at an output of the device or process apparatus; this method is very reliable since it is based on measurements; this method further provides information in real time on the emission of pollutants by the device or process apparatus through the above at least one communication information system;

transmitting an offset or non-offset status information signal can be performed in response to one of the following: operating the device or receiving data or information corresponding to selection of an operation mode for operating the device under a pollutant offset mode or a pollutant non-offset mode when the device is operated or checking that the device detected as being under operation is the pollutant-emitting device associated with a subscriber's account that has been previously registered by a subscriber for subscribing to a pollutant offset program; this transmission may be performed without any human intervention, once the device or process has been operated or data or information received; the automatic transmission may provide security regarding the use of the device in some circumstances where the user cannot at the same time use the device and perform another action; receiving the above data or information may take the form of receiving a signal, e.g. a pollutant offset mode signal; this transmission or sending is performed in real time in the course of operation/use of the device;

data or information corresponding to selection of an operation mode for operating the device under a pollutant offset mode may comprise a selected or designated pollutant offset factor which defines an offset rate for offsetting; the indication by the at least one information system (e.g. emission or communication or transmission of information) whether a pollution-offset procedure has been implemented or not may also take into account the offset factor (for example, the emitted or communicated information may be representative of the offset factor); more generally, the offset status information signal may depend on the selected or designated offset factor;

the at least one information system may comprise at least one of the following: a communication apparatus that is adapted to communicate information on one or more communication networks, in particular social networks through the Internet; one or more light elements adapted to be illuminated in a predetermined manner; one or more sound elements adapted to generate sound in a predetermined manner; and/or at least one display adapted to display a predetermined message;

the method may further comprise processing, receiving and/or transmitting subscription or subscriber information in connection with a pollutant offset program; a unique link can therefore be established between the pollutant-emitting device and a pollution-offset program via a subscribing/subscriber account; this link is in place during operation of the device and emission of pollutant(s) by the latter and indication by the at least one information system (e.g. emission or communication or transmission of information) whether a pollution-offset procedure has been implemented or not; it is to be noted that unique/identified credits are bought via the subscribing/subscriber account and allocated to the device (this may be viewed as certification of the method);

the method may further comprise processing, receiving and/or transmitting data sufficient to generate a certification that a payment or engagement to pay for offsetting a quantity of GHG or other pollutant emitted by operation of the device has been implemented. Making it known during the use of the device that emission of pollutant(s) by the latter has been at least partially offset may be accompanied by the generation of a certificate based on actual data/information related to the operation/use of the device; this is not the result of a declarative approach as known in the prior art since the certificate may be generated in the course of performance of the above method in association with the phase of operation/use of the device;

Another object of the invention is a system for incentivizing management or reduction of emission of one or more pollutants in connection with operation of a pollutant-emitting device, characterized in that the system comprises:
  a signal generation module for generating an offset or non-offset status electronic signal, said signal including:
    identification information identifying the device under operation,
    pollutant offset information regarding a selected operation mode for operating the device either under a pollutant offset mode or a pollutant non-offset mode of a pollutant offset program for offsetting in a certified or certifiable manner at least part of the quantity of pollutant(s) emitted by the device, the selected operation mode for operating the device under a pollutant offset mode being representative of a pollution-offset procedure that has been implemented in the pollutant offset program,
    time information representing time at which the device has been detected as operated, a transmission module for transmitting said generated offset or non-offset status electronic signal via a wireless communication network, at least one information system that is configured both to receive said transmitted generated offset or non-offset status electronic signal and transmit offset incentivization information in real time during operation of the device from information contained in the received signal, said transmitted offset incentivization information indicating whether a pollution-offset procedure has been implemented or not in the pollutant offset program for offsetting in a certified or certifiable manner at least part of the quantity of pollutant(s) currently emitted by the device.

Such a system is a new system which operates automatically, i.e. without any direct human action, during operation of the device and makes it known in real time that the device operates while offsetting its emission of pollutant(s). The signal uniquely identifies the device and its current operation.

The system brings the same advantages as the method regarding the generation, transmission of the signal and transmission of offset incentivization information.

This system comprises at least one sub-system or entity and the at least one information system. However, the system may comprise more than one sub-system as it has already been explained above in relation with the method. The sub-system may directly communicate with the device and the at least one information system. Alternatively, there is one sub-system that directly communicates with the device and another one sub-system communicating with the first sub-system.

According to other possible features of the above system taken either alone or in combination with each other:
- the system further comprises at least one pollutant-emitting device;
- the system further comprises at least one sub-system including at least one of the signal generation module and the transmission module;
- the system further comprises at least one communication sub-system or apparatus that is configured to communicate with the device under operation for identifying the latter (ex: from data or information contained in the device and available the latter is under operation);
- the system further comprises at least one communication sub-system or apparatus that is configured to communicate with the device under operation for detecting operation of the latter;
- the system further comprises at least one sub-system including hardware and/or software specially adapted to process, receive and/or transmit identification information identifying the device under operation;
- the system further comprises at least one sub-system including hardware and/or software specially adapted to process, receive and/or transmit information according to which the device is under operation and/or time information at which the device has been detected as operated;
- the system further comprises at least one sub-system that is configured to check whether the detected device under operation is the pollutant-emitting device associated with a subscriber's account that has been previously registered by a subscriber for subscribing to a pollutant offset program for offsetting in a certified or certifiable manner at least part of the quantity of pollutant(s) emitted by the device under operation;
- the system further comprises at least one sub-system that is configured to check the existence of a subscriber's account that has been previously registered by a subscriber for subscribing to a pollutant offset program for offsetting in a certified or certifiable manner at least part of the quantity of pollutant(s) emitted by a pollutant-emitting device;
- the system further comprises at least one sub-system that is configured to check whether any prepayment procedure has been set up when registering the subscriber's account; the above three "at least one sub-system" can be one and the same sub-system or different sub-systems;
- the system further comprises at least one sub-system (an authentication entity) that is configured to store said information contained in the offset or non-offset status electronic signal for subsequent authenticity check; this at least one sub-system may be different from the previous sub-system(s) or identical thereto;
- the system further comprises at least one sub-system (an authentication entity) that is configured to compare subsequent information contained in an electronic signal and that is configured to activate said at least one information system with said stored information and checking authenticity of said compared subsequent information; this at least one sub-system may be different from the previous sub-system(s) or identical thereto;
- said at least one information system is further configured to extract information contained in the received signal, process said extracted information and generate at least one command for activating said at least one information system and transmitting offset incentivization information depending on said information;
- the at least one information system comprises at least one of the following: a communication apparatus that is adapted to communicate information on one or more communication networks, in particular in one or more social networks through the Internet; one or more light elements adapted to be illuminated in a predetermined manner; one or more sound elements adapted to generate sound in a predetermined manner; at least one display adapted to display a predetermined message;
- the system also may comprise at least one subscribing sub-system, wherein said at least one subscribing sub-system includes hardware and/or software specially adapted to process, receive and/or transmit subscription or subscriber information in connection with a pollutant offset program;
- the at least one subscribing sub-system may include at least one transmitting device adapted to transmit said offset status information signal to said at least one information system; this transmission may be performed either directly or through an intermediary element such as the device or an apparatus associated therewith;
- the system also may comprise at least one payment sub-system, wherein said payment sub-system includes hardware and/or software specially adapted to process, receive and/or transmit data sufficient to generate a certification that a payment or engagement to pay for offsetting a quantity of GHG or other pollutant emitted by operation of the device has been implemented;
- the at least one subscribing sub-system also may include one or more communication elements adapted to transmit and/or receive data or information to and/or from said at least one payment sub-system; transmission and/or reception of data or information may therefore be secured in a reliable manner between the above sub-systems; this may apply to personal and/or financial data or information of the subscriber and/or user;

the system also may comprise a communication module associated with said pollutant-emitting device, wherein said communication module includes hardware and/or software specially adapted to transmit data or information corresponding to selection of a pollutant offset mode for operating the device under a pollutant offset mode when the device is operated; this information may be used for generating the offset status information signal which will control the indication by the at least one information system (e.g. emission or communication or transmission of information) whether a pollution-offset procedure has been implemented or not accordingly;

the system also may comprise a communication module associated with said pollutant-emitting device, said communication module being adapted to selectively transmit data or information to said at least one subscribing sub-system and/or said at least one payment sub-system, said selectively transmitted data being representative of subscription or subscriber information in connection with a pollutant offset program;

the at least one pollutant-emitting device is an automobile.

Another object of the invention is a system for incentivizing management or reduction of emission of one or more pollutants in connection with operation of a pollutant-emitting device or process, characterized in that the system comprises:

at least one pollutant-emitting device (optional),
at least one sub-system,
at least one information system.

The at least one information system has the same features as those mentioned above in relation with the first system according to the invention.

The at least one sub-system may include the above-mentioned signal generation module and transmission module or only one of those modules.

The at least one sub-system may also be in direct communication with the device, in particular for identifying the latter (information on the identity of the device) and detecting its operation (information on the operation of the device). In another possible configuration the device is part of this system.

Alternatively, a communication apparatus (e.g; a smartphone or any other communication apparatus, mobile or not) which is a second sub-system is in direct communication with the device. The communication cooperates with the first sub-system.

In one embodiment, a system is provided which comprises a vehicle/an automobile, and at least one information system associated with said vehicle/automobile, said at least one information system being adapted to receive an offset status information signal (as further detailed above) and to indicate, in response to receiving said offset status information signal, whether a pollution-offset procedure has been implemented in a pollutant offset program for offsetting in a certified or certifiable manner at least part of the quantity of pollutant(s) emitted during operation of said vehicle/automobile. Indicating whether a pollution-offset procedure has been implemented may take the form of emitting or communicating or transmitting information during operation of the vehicle/automobile, said emitted or communicated information being representative of whether a pollution-offset procedure has been implemented.

BRIEF DESCRIPTION OF THE DRAWINGS

Other features and advantages will appear in the following description, made only by way of example in a non-limiting and non-exhaustive manner, with reference to drawings in which.

DETAILED DESCRIPTION

In the following description, pollutants may include GHG (Green House Gases), e.g. $CO_2$ and the primary product may be fuel. It is to be understood that these are only examples, and that pollutant is meant to encompass any component caused to be emitted or produced by operation of a device or process. Likewise, the primary product utilized by a device or in a process may be materials other than fuel, such as water or any other material utilized in the operation of a pollutant-emitting device or process.

Fuel can be understood as fossil fuels (e.g., hard coal, brown coal, peat, coal gases, oil products and natural gas), biofuels and waste (e.g., wood, wood waste, other solid waste, industrial and municipal waste, biogases and liquid biofuels).

It will be understood that the embodiments shown in the FIGS. are merely exemplary. For example, while the system shown in FIG. 1a is described herein in connection with a fuel-consuming device, such as a vehicle, it is to be understood that the system is intended for use in connection with the operation of any device or process which causes emission or production of at least one pollutant.

Figure 1A:
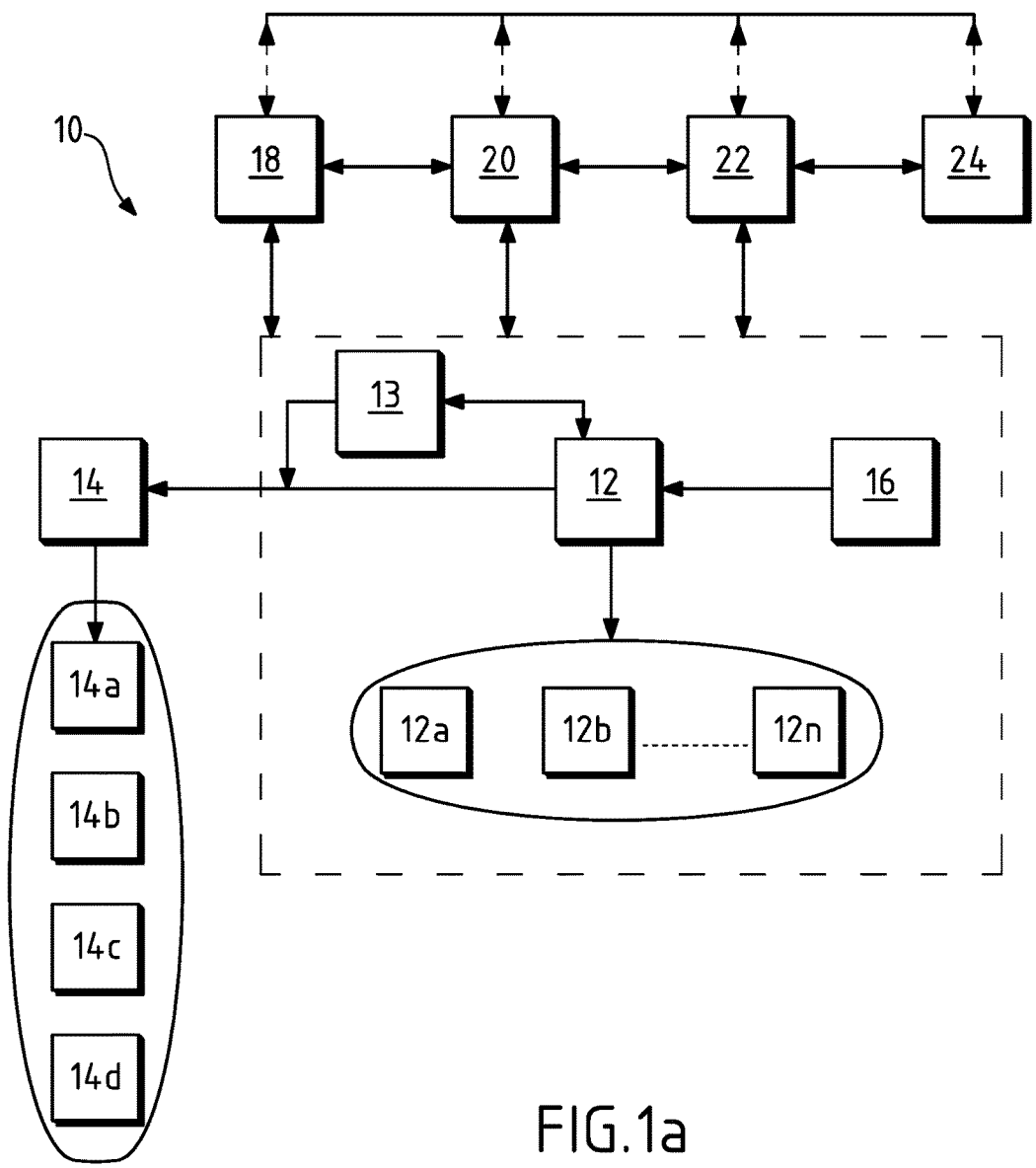
FIG. 1a is a schematic diagram of a system in accordance with an embodiment of the invention.

With reference to FIG. 1a, at least one device 12, optionally including several devices 12a, 12b, . . . , 12n, is operable to utilize a first quantity of primary product, such as fuel, and emits or produces a second quantity of pollutant(s), e.g. GHG such as $CO_2$.

At least one information system 14 is adapted to indicate, in response to receiving an offset status information signal, during operation of the device 12, whether a pollution-offset procedure has been implemented in a pollutant offset program for offsetting in a certified or certifiable manner at least part of the second quantity of pollutant(s) emitted by the device. The offset status information signal can be generated and transmitted from or by one or more sub-systems including, for example, a subscribing system 18, a payment system 20, a certifying system 22 or an offsetting system 24. Preferably, the offset status information signal is caused to be transmitted to information system 14 by subscribing system 18. Generally speaking, transmission of data or information whatever their nature, e.g. in the form of one or more signals may be performed in an encrypted or ciphered form to guarantee the security when exchanging data or information. The methods used for encrypting or ciphering data or information are known per se.

It is to be noted that system 10 may optionally further comprise a communication apparatus 13. Such a communication apparatus may be a portable one such as a smartphone, a tablet, a connected watch, a dedicated connected communication device, or any connected apparatus that is capable of communicating data through the Internet; alternately, such a communication apparatus may be a computer that is specially programmed and adapted to communicate data through the Internet. The offset status information signal may be caused to be transmitted to information system 14 by subscribing system 18 either through device 12 or communication apparatus 13.

An optional supply unit 16 is adapted to supply the device 12 with the first quantity of primary product, e.g. fuel, to be consumed by the device. Subscribing system 18 preferably includes hardware and/or software specially adapted to process, receive and/or transmit subscription or subscriber information in connection with a pollutant offset program. As mentioned, subscribing system 18 also preferably includes at least one transmitting device for causing an information signal to be transmitted to information system 14.

An optional payment system 20 includes hardware and/or software specially adapted to process, receive and/or transmit data sufficient to register and/or process subscriber/user bank account details and selected methods of payment, receive payments and/or payment orders, and validate them. Preferably, subscribing system 18 includes communication elements adapted to transmit and/or receive data or information to and/or from payment system 20, such as by use of a data- or tele-communication network.

An optional certifying system 22 includes hardware and/or software specially adapted to process, receive and/or transmit data sufficient to generate a certification that a payment or engagement to pay for offsetting a quantity of GHG or other pollutant emitted by operation of the device has been implemented.

An optional offsetting system 24 includes hardware and/or software specially adapted to process, receive and/or transmit data sufficient to implement an offset of the GHG or other pollutant emission that has been paid for by the subscriber/user of the device.

One or more of payment system 20, certifying system 22 and offsetting system 24 may include at least one transmitting device for causing an information signal to be transmitted to information system 14, either in place of or in addition to the above-mentioned at least one transmitting device of subscribing system 18.

It is to be noted that the different sub-systems may each be composed of several sub-systems, in particular as regards payment system 20, certifying system 22 and offsetting system 24. Likewise, more than one sub-system may be provided in combination as a single system or multiple systems at a shared location. Thus, for example, subscribing system 18, payment system 20 and/or certifying system 22 may be provided in combination. Additionally, one or more of systems 18, 20, 22 and 24 may be communicatively connected, such as by a data- or tele-communication network.

Supply unit 16 may be provided as a network such as a gas network, with or without gas meters adapted to measure the volume of gas entering into the device.

The device 12 and/or supply unit 16 may each comprise a communication module having a sending unit and optionally a receiving unit for exchanging (sending and receiving) signals, in particular with systems 18, 20, 22 and/or information system 14.

The device 12 and/or supply unit 16 also may each comprise a computing/calculating element adapted to calculate/estimate data, a measurement unit, and/or an inputting element or unit (e.g. a keypad, tactile screen, etc.) adapted to permit inputting of information/data, including one or several selection commands (e.g. offset mode, offset factor, etc.), and/or an outputting element or unit (e.g. screen) adapted to permit visualizing of some or all inputted information/data.

Alternately, another device such as a portable communication device (e.g. a smartphone) may be provided as the communication module, the computing/calculating element or unit, and/or the inputting element or unit and/or the outputting element or unit. This other device may be communication apparatus 13.

The at least one information system 14 may comprise one or more of the following:

- a communication apparatus 14a that is adapted to communicate information on communication networks such as social networks through the Internet; such a communication apparatus may be a portable one such as a smartphone, a tablet, a connected watch, a dedicated connected communication device, or any connected apparatus that is capable of communicating data through the Internet; alternately, such a communication apparatus may be a computer that is specially programmed and adapted to communicate data through the Internet and that is embedded or not in the device; it is to be noted that communication apparatus 14a may be integrated in subscribing system 18 or communication apparatus 13; by way of example, when communication apparatus 13 is a smartphone or the like, the latter may receive a offset status information signal (or non-offset status information signal) and then trigger API commands so as to generate one or several messages over a social network;
- at least one light element or unit 14b adapted to illuminate or produce light in a predetermined manner; e.g. colored light is emitted by a light source such as one or several of a lamp, a LED, an OLED, etc. and a color used (e.g. green) is indicative of an ongoing GHG offset program and another color (e.g. red) is indicative of no ongoing GHG offset program; other possible lighting devices or patterns may alternately be provided such as those which are adapted to produce a lighting pattern based on one or several light sources which may flash on and off or the intensity of which may vary, an ambient light with a fixed or variable intensity, or a light message indicating the offset mode used. This manner of communicating/emitting information via information system 14 is particularly safe when implemented onboard a vehicle;
- at least one sound element or unit 14c adapted to generate a sound or audio signal in a predetermined manner, the generated sound or audio signal being indicative of an ongoing GHG offset program or of no ongoing GHG offset program; a predetermined sound being indicative of a sufficient prepaid account or insufficient prepaid account, e.g. an audio signal carrying intelligible information (audible message or music) may be emitted or just a beep or whistle;

at least one display element or unit 14d adapted to display a predetermined message on at least one display, the displayed message being indicative of an ongoing GHG offset program or of no ongoing GHG offset program; the at least one display optionally being a screen, a LCD screen, car onboard computer screen, any touch screen, etc.

Several of the above-listed elements may be used simultaneously, such as at least one light element and at least one sound element or unit for both producing a light and a sound indicative of an ongoing GHG offset program or of no ongoing GHG offset program.

At least one of the above elements 14a-d may be associated and in communication with the communication module of device 12 or supply unit 16, and/or any of systems 18, 20, 22 and 24, so that an offset status information signal can be transmitted (e.g., via a smartphone (Iphone, Android, etc.), USB, Ipod, smartcard such as may be used for Ecall system in an embedded system in a vehicle, PIM ("Protocol Independent Multicast"), any connected device, messaging or other telecommunication unit, any existing GPS device such as TomTom, Coyote, etc.) to said at least one of these elements in order to cause the latter to emit or communicate or transmit information as described.

At least one of the above elements 14a-d may be in direct and permanent or temporary connection with the pollutant-emitting device and, for example, may be part of the device or may be an add-on module affixed thereto or plugged in. Alternately, at least one of the above elements 14a-d may be located remotely from the device, e.g. in a remote location, such as where the pollutant-emitting device is hidden inside another object or otherwise not visible, so that the signal or information emitted by the at least one element of information system 14 can be made available to the public (e.g. emitted information can be made visible through produced light or displayed message). The description of FIGS. 5 to 8 may apply to any the above information systems.

Figure 1B:
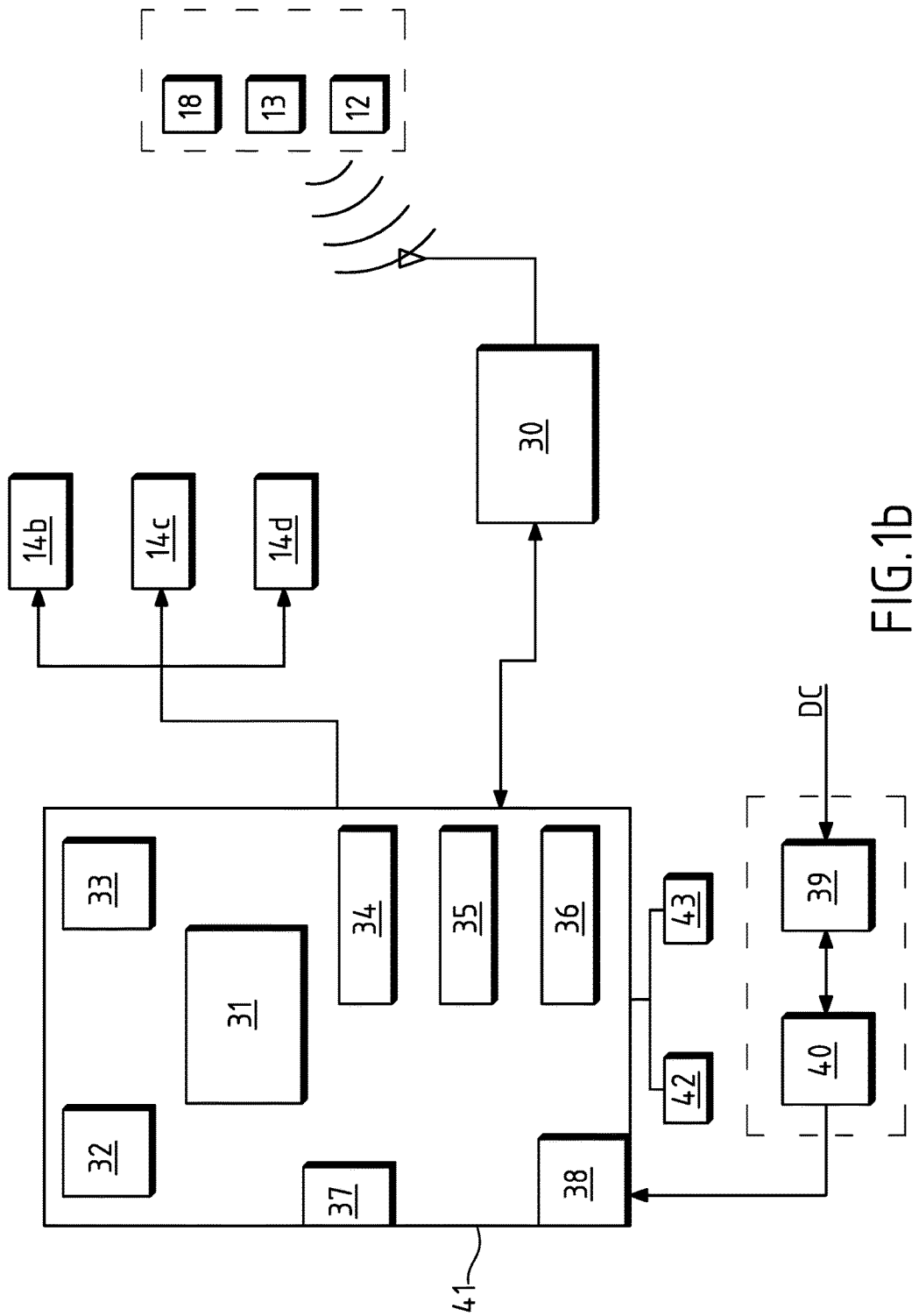
FIG. 1b is a schematic diagram of a more detailed part of the FIG. 1a system.

FIG. 1b illustrates different units/components that may be used in the system when an offset status information signal (or non-offset status information signal) is received from, e.g. subscribing system 18, communication apparatus 13 or device 12 in order to cause at least one of the communication apparatuses 14b-d to emit or communicate or transmit information as described above.

These different units/components illustrated may be integrated in one of the communication apparatuses 14b-d or associated therewith as represented in FIG. 1b.

These different units/components may include:
a communication unit 30 which comprises a transmitting/receiving unit in particular for receiving an offset status information signal (or non-offset status information signal); this unit may use, e.g. Bluetooth or Wifi transmission or the like;
a data processing unit 31 or processor associated with a flash memory unit 32 and a RAM unit 33;
a digital input/output unit 34;
a microcontroller unit 35;
an analog output unit 36;
different inputs 37 for connecting USB devices, SD cards, etc.;
a power input 38 which receives as an input electrical power; external DC charger provides electrical power to a voltage regulator unit 39 which is connected to a battery unit 40 an output of which is directed to power input 38; optionally, both units 39 and 40 may integrated inside a module 41 including the above elements/units;
user interface units 42, 43, e.g. buttons or the like are connected to module 41 or affixed thereto.

All the necessary internal connections between the different units/elements have not been illustrated for the sake of clarity.

It is to be noted that an offset status information signal (or non-offset status information signal) is received by unit 30 and transmitted to data processing unit 31 for processing purpose (in particular after decryption). The signal is therefore analyzed so that a triggering signal be issued by unit 31 and activates the corresponding apparatus/unit 14b, 14c, 14d for appropriate emission or communication of information. Further information on the way of functioning of an information system can be found later on in the description of FIGS. 5a to 8.

The above-mentioned system 10 may be operated with regard to different GHG emissions such as carbon dioxide ($CO_2$), Methane ($CH_4$), Nitrous Oxide ($N_2O$), water vapor ($H_2O$), Ozone ($O_3$), ChlorofluoroCarbon (CFC), etc. The above-mentioned system 10 may find a number of applications in which the device may be of different types: a car, a boiler, a gas bottle, an airplane, a boat, a house, a building, a heating system, a cooking system, a bus, a train, a helicopter, a heavy truck, a tractor, or any other device that consumes fuel or utilizes primary product when operating it.

Figure 2A:
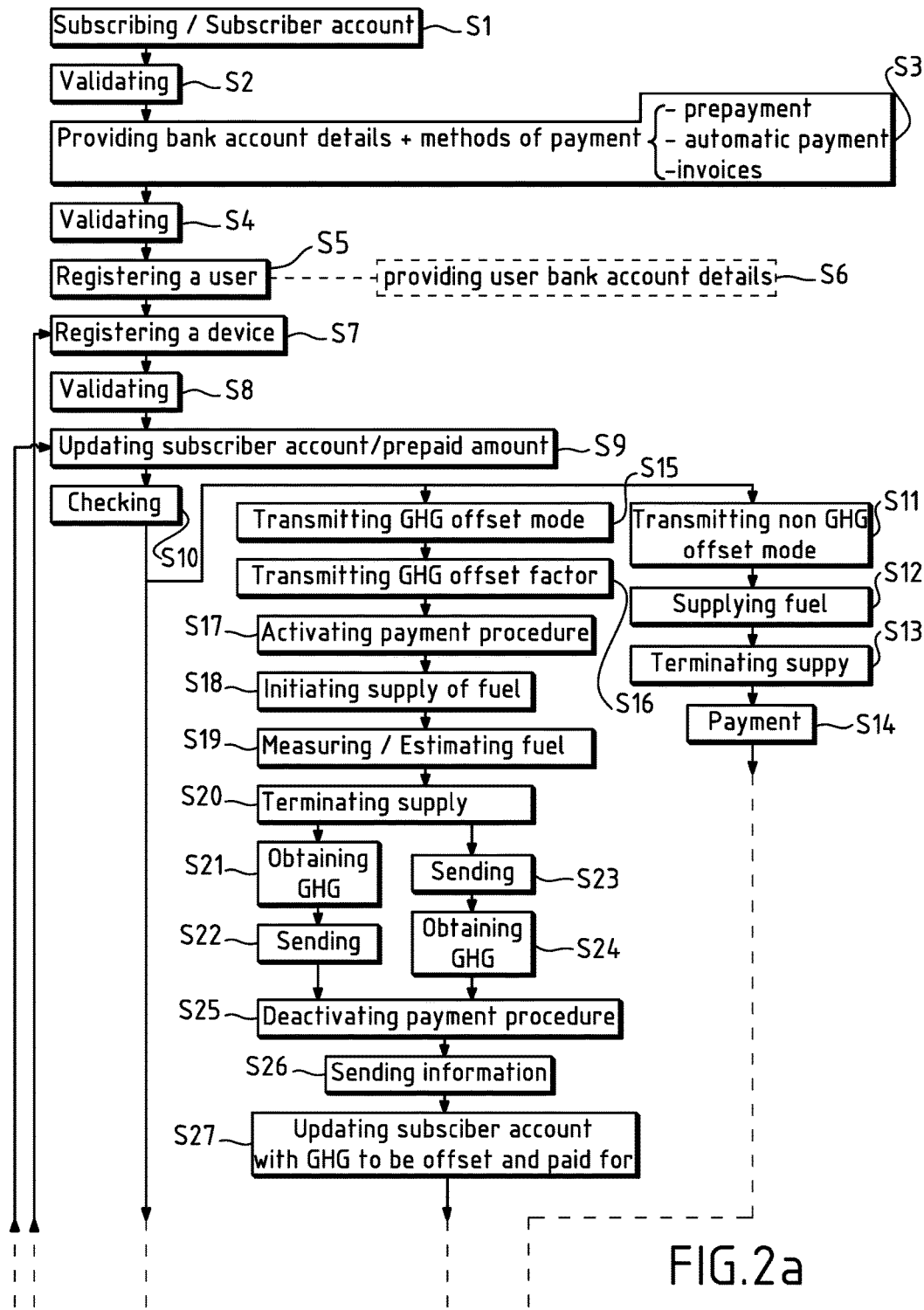
FIGS. 2a and 2b illustrate a process diagram in accordance with an embodiment of the invention.
Figure 2B:
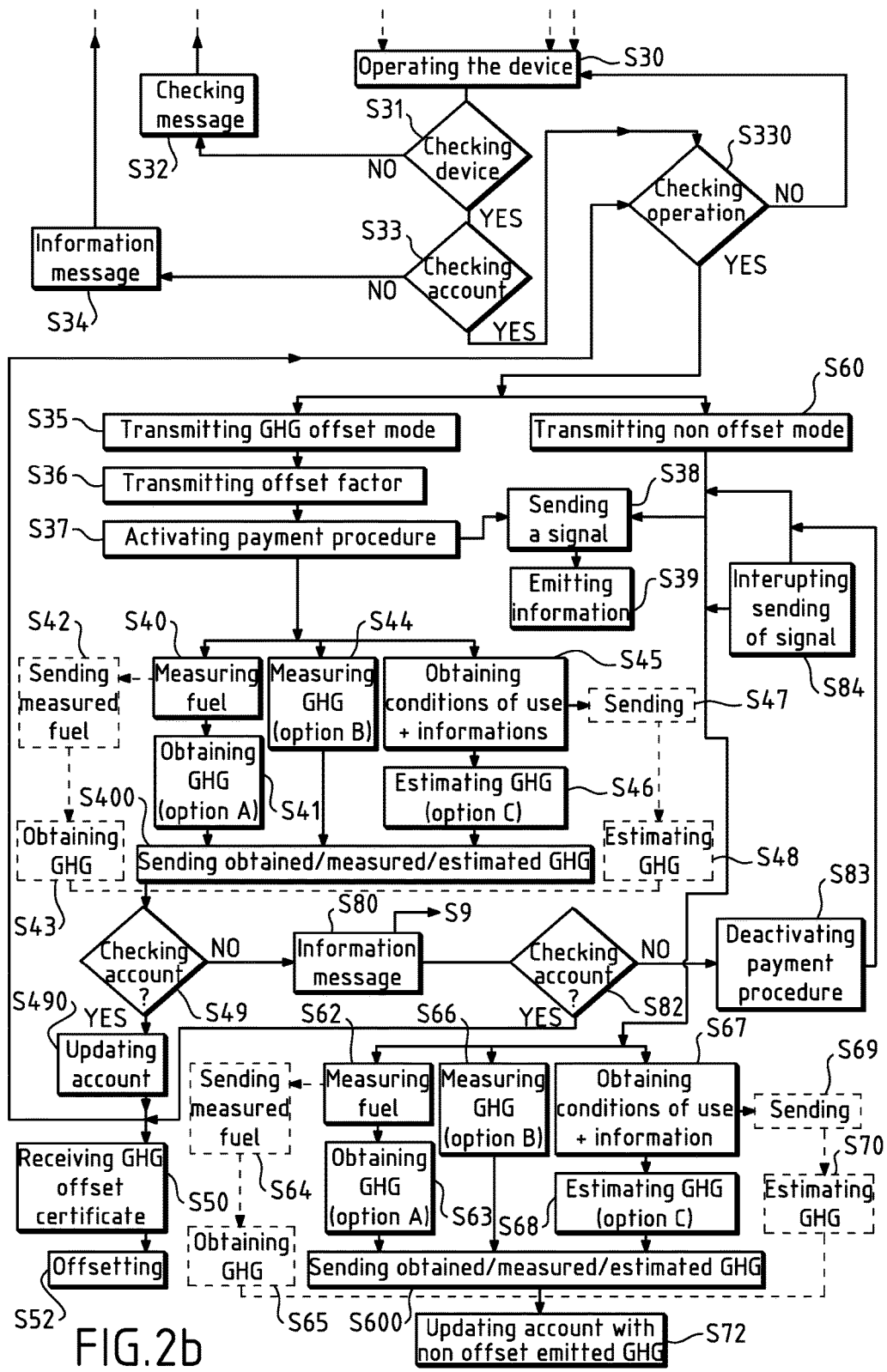

In one non-limiting example, system 10 may operate in the manner shown in the flowcharts of FIGS. 2a and 2b, now described. These flowcharts apply to a fuel-consuming device, such as a vehicle.

In FIG. 2a, step S1 corresponds to the transmission of data or other information to subscribing system 18 such that a subscriber subscribes to a pollutant offset program, e.g. via a device-associated communication module or a smartphone. A subscriber may be, e.g., a user or operator of pollutant-emitting device 12. Alternately, a subscriber may be any seller of a pollutant-emitting device or any seller of a communication module intended to be connected or associated with a pollutant-emitting device, upon the sale of such device. Generally, a subscriber is contemplated as any person or Company authorized to implement a subscription. The transmission of data or other information in step S1 therefore results in the establishment and/or registration of a subscriber account. Ordinarily, the subscriber will be a user/operator of device 12 or devices 12a-n. However, as is described below at step S5, a user who is not the subscriber also may be registered subsequently.

At step S2, subscribing system 18 processes data or information received in step S1 so as to validate the subscription to a pollutant offset program.

At step S3, data or information relating to a subscriber's bank account details and selected payment methods regarding the pollutant offset program, if any, are transmitted to payment system 20. As noted, payment system 20 may be provided separately from or in combination with any other sub-system, including subscribing system 18, certifying system 22 and/or offsetting system 24. The transmission of account or payment data or information in step S3 may be implemented via a communication module associated with a pollutant-emitting device 12 or supply unit 16, via a portable communication device, or via any other suitable apparatus or mechanism for transmitting such data or information to payment system 20.

Exemplary methods of payment include: prepayment, automatic periodic (e.g. monthly) debiting from the subscriber account on an actual basis, or periodic (e.g. monthly) debiting or payment on a predetermined basis combined with regularizing at the end of a fixed period (e.g. annually) based on actual data, payment on invoices, etc. Any other method of payment may be utilized. A given payment method may be selected by a subscriber or any other authorized individual or entity.

At step S4, the system validates the information and selections transmitted in step S3. This validation may be performed by payment system 20, such as through authentication of bank data and confirmation of the financial flow security between the subscriber system 18 and the payment system 20 corresponding to the subscriber account.

Validation at step S4 may be performed by subscribing system 18, e.g. at or about the time of performing step S1, which validation information may subsequently be communicated from subscribing system 18 to payment system 20.

At step S5 the system may provide a mechanism by which a non-subscriber may register with subscribing system 18 in association with the subscriber account previously created.

Optionally, in a step S6 payment system 20 receives (either directly or indirectly via subscribing system 18) information or data regarding the non-subscriber's bank account details and selected methods of payment which are to be in connection with the pollutant offset program during operation of device 12 or devices 12a-n. Exemplary payment methods are as described in connection with step S3 above.

Alternatively, step S6 may be omitted and the system may process non-subscriber payments via the subscriber system 18.

At step S7, the system may process data or information so as to identify and register device 12 or devices 12a-n as authorized for use in association with the subscriber account. Such processing of data or information at step S7 may be performed by, e.g., subscribing system 18 and/or payment system 20.

At step S8 information provided and selections made at the previous steps S5 to S7 are validated. This validation may be performed, e.g., by subscribing system 18 and/or payment system 20.

At step S9 the system causes the subscriber account to be updated with the results of previous steps. Included at step S9 is, optionally, processing of a one-off prepayment corresponding to offsetting a predetermined quantity of pollutant to be emitted by the device when operated. The updating and optional prepayment processing operations at step S9 may be performed, e.g., by subscribing system 18 and/or payment system 20.

At step S10 the system may process received data or information so as to check bank account status (e.g., if the prepayment has been selected as a method of payment, it is checked whether the account has a predetermined or threshold amount of money), whether the subscription is valid, whether bank account information is valid, whether any device authorized in relation to the subscribed account has been reported stolen, etc. Step S10 may be performed by subscribing system 18 and/or payment system 20.

Following step S10, the flowchart in FIG. 2a depicts an optional supply branch including steps S11 to S27 which may be performed in connection with supply of device 12 or devices 12a-n with fuel to be consumed thereby. The optional fuel supply branch includes two sub-branches:
a right sub-branch including steps S11 to S14 which concerns a supply operation with no GHG offset, and
a left sub-branch including steps S15 to S27 which concerns a supply operation with GHG offset.

The right sub-branch includes a first step S11 during which either a non offset mode selection signal is transmitted or no offset mode selection signal is transmitted. When transmitted such a signal is representative of a selection of a non offset mode as an input of information or data to the system. A non offset mode selection signal may be implemented via the inputting element or unit associated with the device(s) 12 or supplying unit 16, or via the previously described portable communication device such as a smartphone. A non offset mode selection signal may be transmitted to and processed by any of the previously described sub-systems, preferably subscribing system 18 or payment system 20, most preferably subscribing system 18.

In either instance, the right sub-branch proceeds with the initiation of supply of a first quantity of fuel to the device(s) (step S12), termination of the supply (step S13), and payment for the supplied quantity (step S14).

The left sub-branch includes a first step S15 during which a pollutant offset mode signal is generated. Such offset mode signal is representative of a selection of a pollutant offset mode as an input of information or data to the system. Such offset mode signal represents an instruction to the system that the subscriber account is to be updated in accordance with the data or information generated in the course of the following steps S16-S27 as described hereafter. An offset mode selection signal may be implemented via the inputting element or unit associated with the device(s) 12 or supplying unit 16, or via the previously described portable communication device such as a smartphone. An offset mode selection signal may be transmitted to and processed by any of the previously described sub-systems, preferably subscribing system 18 or payment system 20, most preferably subscribing system 18.

At step S16 the system transmits and/or receives data or information corresponding to an offset rate factor. The offset rate factor corresponds to a defined or selected offset rate. The offset rate factor may be implemented via the inputting element or unit associated with the device(s) 12 or supplying unit 16, or via the previously described portable communication device such as a smartphone. Data or information corresponding to an offset rate factor may be transmitted to and processed by any of the previously described sub-systems, preferably subscribing system 18 or payment system 20, most preferably subscribing system 18.

Exemplary offset rate factors include:
an overcompensation factor which corresponds to the case where the second quantity of pollutant which is emitted by the pollutant-emitting device is to be overcompensated by a pollutant offset program, such as where the payment to be made in the payment procedure to be activated exceeds the payment that would be necessary for offsetting the second quantity of pollutant emitted or estimated to be emitted during operation of the device. This overcompensation factor may be chosen during the subscription, and/or may be chosen or changed at any time. Examples of overcompensation factors are 200%, 300%, 1000%, or any other factor that is greater than 100%; and
different other factors such as 25%, 50%, 75% and 100%.
Other factors may be envisaged and are considered within the scope of the present disclosure.

At step S17 a payment procedure in the pollutant offset program is implemented, preferably automatically, following the completion of previous steps S15 and S16.

According to a variant embodiment, in case there is no possible connection between the pollutant-emitting device, associated communication module, or portable communication device (e.g. smartphone) that permits contemporaneous transmission of data or information to one or more of the sub-systems, e.g. subscribing system 18 or payment system 20, the amount of offset corresponding to the offset rate factor is paid via a supply unit payment system (e.g. pump payment system) when the supplying operation has been completed. Subsequently or concurrently, the supply unit payment system activates a payment procedure to transfer the amount paid to the payment system 20.

It will be understood that the transmittal of information, including payment information, relating to the selection of a pollutant offset mode or offset rate factor may alternatively be directed to subscribing system 18, certifying system 22 and/or offsetting system 24.

Activating the payment procedure in the pollutant offset program launches the funding of the program for offsetting in a certified manner at least part (depending on the selected offset rate factor) of the second quantity of pollutant which is emitted or estimated to be emitted by the device when the device is operated.

At step S18 the supply of the device(s) with a first quantity of fuel is initiated.

At step S19 the first quantity of fuel that is being supplied to the device is measured. This measuring step may be performed by a measurement unit in the supply unit or associated therewith.

At step S20 the supply is terminated.

Following step S20 two different sequences of steps may be envisaged:
either at step S21 the second quantity of pollutant expected to be emitted by the device when the device is operated is obtained by calculation based on the measured first quantity of fuel supplied to the device and this data is sent (step S22) in an encrypted form to one or more of the described sub-systems, such as the certifying system 22 or the subscribing system 20;
or at step S23 the measured first quantity of fuel supplied to the device is transmitted in an encrypted form to one or more of the described sub-systems, such as the certifying system 22 or the subscribing system 20, which then processes the transmitted encrypted data and obtains a second quantity of pollutant expected to be emitted by the pollutant-emitting device when the device is operated by calculation based on the measured first quantity of fuel supplied to the device.

In either instance, at next step S25, the payment procedure is automatically deactivated, optionally by operation of the supply unit.

At step S26 information regarding the obtained second quantity of pollutant expected to be emitted, and the amount paid for offsetting part, all or more than this quantity, is transmitted to one or more of the described subsystems, e.g. subscribing system 18 or payment system 20. Transmission of information in step S26 may be implemented directly by the supply unit 16 or via a communication module or portable communication device associated with the subscriber or with the pollutant-emitting device.

At step S27 the subscriber account is updated corresponding to the pollutant quantity paid for. Consequently, the system updates the subscriber account with a pre-offset payment amount which will be applied or used in determining any offset status information signal transmitted to information system 14 during operation of the device 12.

This terminates the left sub-branch of the optional fuel supply branch in FIG. 2a.

The flowchart of FIG. 2a continues with steps shown in FIG. 2b. As shown in FIG. 2b, checking step S10 or updating step S27 (if the optional supply branch steps S15-S27 are performed) or payment step S14 (if the optional supply branch steps S11-S14 are performed) may be followed by the transmission of a signal or information (optional) at step S30 corresponding to operation of the device 12 or devices 12a-n. This optional signal or information may be representative of the subscriber account.

Upon initial operation of the device(s) a test step S31 is performed by the system which checks whether the device(s) has been registered or not.

In the negative, step S31 is followed by step S32 which sends an information message, e.g. to the user or subscriber via a communication module or portable communication device associated with the pollutant-emitting device, prompting input of registration information to the system in the manner described in connection with step S7. An information message sent in step S32 may be transmitted, e.g., to a smartphone, or messaging or voice automotive instructions when the device is a car, or any other communication instrument available in the environment of the pollutant-emitting device.

In the affirmative, another test step S33 is performed whereby bank account information is checked for sufficient funds with respect to a predetermined amount of money or threshold amount, whether the subscription is still valid or the bank account still exists, whether any device associated with the subscribed account has been reported stolen, etc.

If an unsatisfactory result is obtained in step S33, step S34 is performed in which the system sends an information message e.g. to the user or subscriber via a communication module or portable communication device associated with the pollutant-emitting device, prompting input of account information to the system in the manner described in connection with step S9. An information message sent in step S34 may be transmitted, e.g., to a smartphone, or messaging or voice automotive instructions when the device is a car, or any other communication instrument available in the environment of the pollutant-emitting device.

Otherwise, step S33 is followed by a test step S330 which checks whether the device is in operation.

In the negative, the process returns to step S30 already described.

To be noted that the order of the steps S31, S33 and S330 may be changed. For instance, step S330 may be performed directly after step S30. Also steps S31 and S33 may be switched whatever the position of step S330 (either after step S30 or after step S33).

In the affirmative, step S330 is selectively followed by either of two sub-branches as depicted in FIG. 2b:
a left sub-branch relating to operation of the device 12 in a pollutant offsetting mode; or
a right sub-branch relating to operation of the device 12 on a pollutant non-offsetting mode.

The left sub-branch may be implemented at step S35 by transmitting a signal in response to an input of information or data to the system representing a selection of a pollutant offset mode to be used during the current operation of the device. Such offset mode selection signal may be implemented, e.g., via the inputting element or unit associated with the device(s) 12, or via the previously described portable communication device 13 such as a smartphone. An offset mode selection signal may be transmitted to and processed by any of the previously described sub-systems, preferably subscribing system 18 or payment system 20, most preferably subscribing system 18.

At step S36 the system may transmit and/or receive data or information corresponding to an offset rate factor. The offset rate factor corresponds to a defined or selected offset rate. Data or information corresponding to an offset rate factor may be transmitted to and processed by any of the previously described sub-systems, preferably subscribing system 18 or payment system 20, most preferably subscribing system 18.

Exemplary offset rate factors include:

an overcompensation factor which corresponds to the case where the second quantity of pollutant which is emitted by the pollutant-emitting device is to be overcompensated by a pollutant offset program, such as where the payment to be made in the payment procedure to be activated exceeds the payment that would be necessary for offsetting the second quantity of pollutant emitted or estimated to be emitted during operation of the device. This overcompensation factor may be chosen during the subscription, and/or may be chosen or changed at any time. Examples of overcompensation factors are 200%, 300%, 1000%, or any other factor that is greater than 100%; and different other factors such as 25%, 50%, 75% and 100%.

Other factors may be envisaged and are considered within the scope of the present disclosure. An offset rate factor may be obtained from input to the system at step S36, e.g. via the inputting element or unit associated with device 12, or obtained from subscription information previously provided and stored in the system.

The above selections of a pollutant offset mode and possible offset factor may be made previously (through user or subscriber input), e.g. during one of the above steps S1 to S10 or between any two of these consecutive steps. Thus, selection of a pollutant offset mode and possible offset factor are not made at steps S35 and S36 and these steps may be omitted.

In the course of step S37 a payment procedure in the pollutant offset program may be activated, preferably automatically, following completion of previous steps S35 and S36.

Activating the payment procedure at step S37 may automatically cause, at step S38, the transmission of an offset status information signal to information system 14 during operation of the device 12. Alternatively, transmission of the signal may be automatically triggered once the checking steps S31, S33 and S330 have been made or at least one of them (whatever their order as explained above). In a possible embodiment activation of the payment procedure does not take place or is automatically launched once the previous checks have been made. As previously described, the offset status information signal is chosen to be representative of whether a pollution-offset procedure has been implemented in a pollutant offset program for offsetting in a certified or certifiable manner at least part of the second quantity of pollutant(s) emitted by the device. The offset status information signal depends on steps S35 and S36 (or S60 in case no offset mode has been selected as will be seen later) and therefore takes into account the offset factor at step S36. In a variant embodiment, the offset status information signal may only depend on step S35 (or S60 in case no offset mode has been selected as will be seen later). The offset status information signal may be transmitted from or by one or more sub-systems including, for example, subscribing system 18, payment system 20, certifying system 22, offsetting system 24, communication apparatus 13 or device 12 itself.

More preferably, the offset status information signal is caused to be transmitted to information system 14 by subscribing system 18 or apparatus 13 or device 12. Alternatively, the offset status information signal is caused to be transmitted to information system 14 by communication apparatus 13 (or by device 12) after being transmitted first from one sub-system to communication apparatus 13 (or to device 12). To be noted that offset status information signal may be generated by one or more sub-systems including, for example, subscribing system 18, payment system 20, certifying system 22, offsetting system 24.

Further possible details of implementation of the invention will be described in relation with FIG. 5a and may complete the present description.

This causes emission or communication or transmission of offset incentivization information (step S39) by information system 14 as described above with reference to FIG. 1a while the device is operating. This is a safe manner to communicate/emit information when using the device, in particular when the attention of the user is drawn by the use of the device (e.g. a car or any other device or vehicle that requires concentration from the user or operator).

Thus it can be considered that the offset status information signal activates/controls information system 14.

The information emitted or communicated or transmitted by information system 14 thereby makes it known, e.g. to the user/operator and/or to the public, either in the street or on the Internet, that part or all of the pollutants being emitted due to operation of the device(s) while the device is operating (real time aspect) is being offset or in the process of being offset.

In parallel to steps S38 and S39, step S37 is followed by several possible steps or sequences of steps aimed at determining or estimating the actual second quantity of pollutant emitted during operation of the device(s) 12.

In a first alternative, at step S40, the amount or rate of utilization of primary product by operation of the device 12, e.g., the amount or rate of consumption of fuel is measured. The following may apply where device 12 is an automobile. It is well-known that European standards drastically help to decrease NOx and CO emissions (less than 1%). This means that control combustion systems have been integrated to ensure efficient conditions of fuel combustion. As a consequence, it is also known that advanced combustion engines are an important issue of actual engineering improvement made by car manufacturers for new fuel (diesel and gasoline) vehicles.

For instance, the company Daimler produces four cylinder engines with direct injection that help to obtain homogeneous direct injection. More particularly, fuel arrives at the injectors via a high pressure line, which leads directly into the combustion chamber, at pressures of up to 140 bars. The accurate quantity of fuel that is required for a particular driving mode is sprayed into the cylinders, where it is almost completely burnt.

As a consequence, the flow rate of fuel that is injected per time gives the volume of fuel consumed during a predetermined period. This actual measurement is obtained in the car and therefore available.

The above can be used to calculate actual fuel consumption via an On Board Diagnostic (OBD) system onboard a car.

It is also known that actual fuel consumption by a car can then be obtained by connecting a car dedicated device which is able to establish a direct link with the OBD system, like Xee or Scangauge or via a smartphone with a dedicated application and a cable such as OBD Link System.

At step S41, the second quantity of pollutant, e.g. GHG, emitted by the device is obtained based on the measured actual consumption e.g. by calculation/estimation based on the combustion stochiometric equations depending on fuel components.

A variant to step S41 may envisage to firstly send (step S42) the measured actual consumption of the first quantity of primary product by the device 12 to at least one sub-system, such as subscribing system 18, payment system 20, certifying system 22 and/or offsetting system 24, which sub-system then processes the transmitted consumption information (step S43) to obtain or estimate the second quantity of actual pollutant emitted due to operation of the device 12 in the manner described above. Measured consumption information may be transmitted, e.g., by a communication module dedicated to or associated with the device 12 or via an intermediary communication element in the chain of transmission such as a smartphone.

Another alternative for determining or estimating the actual second quantity of pollutant emitted during operation of the device(s) 12 is provided in FIG. 2b at step S44, at which the actual second quantity of pollutant emitted by the device 12 is measured. For example, it is known that data relating to $CO_2$ concentration, measurement time and location, temperature, humidity, and atmospheric pressure can be recorded onto a Secure Digital (SD) memory card. This is made by some car manufacturers to control any vehicle $CO_2$ emissions.

A carbon dioxide sensor or $CO_2$ sensor is an instrument for the measurement of carbon dioxide gas. The most common physical principles for $CO_2$ sensors are infrared gas sensors (NDIR) and chemical gas sensors. Measuring carbon dioxide is important when monitoring indoor air quality and also in many industrial processes. Chemical $CO_2$ gas sensors with sensitive layers based on polymer- or heteropolysiloxane provide the main advantage of having a very low energy consumption and can be reduced in size to fit into microelectronic-based systems. On the downside, short- and long term drift effects as well as a rather low overall lifetime are major obstacles when compared with the NDIR measurement principle.

It is also known that collecting $CO_2$ concentration data from many points during a limited measurement period requires use of a multi-point observation method using as many fixed stations or observation vehicles as possible. For multi-mobile observation, many $CO_2$ sensors should be prepared and, therefore, low-cost but accurate $CO_2$ sensors are required. If bicycles or electric bikes are to be used for the observations, small and lightweight sensors are preferable.

In recent years, $CO_2$ sensors made of semiconductors, solid electrolytes, optic fibers, laser diodes, and non-dispersive infrared (NDIR) detectors have been developed for monitoring $CO_2$ concentration. For atmospheric $CO_2$ concentration measurements, NDIR sensors are widely employed since they are stable and very robust against interference by other air components, including pollutants. The NDIR sensor also has excellent durability, and therefore, seems to be the most reliable sensor for atmospheric $CO_2$ measurement(s).

The output of NDIR sensors is affected by temperature, atmospheric pressure, and length of use. To enhance the precision and accuracy of NDIR sensors, it is important to correct the sensors' outputs for these factors. So far, there have been several studies on the calibration of high-cost NDIR analyzers. Only a few studies focused on the performance and calibration methods of small commercial $CO_2$ sensors. There is no report on the recently developed low-cost $CO_2$ sensors produced by several manufacturers.

In a recent study entitled "Comparison of the characteristics of small commercial NDIR $CO_2$ sensor Models and Development of a portable Measurement device" [Yasuda T[1], Yonemura S, Tani A.; Mar. 13, 2012; Multidisciplinary Digital Publishing Institute (MDPI), Basel, Switzerland], to improve the precision and accuracy of recently developed low-cost $CO_2$ sensors, a calibration method combining off-set-correction and linear correction was examined. On the basis of the results of these performance tests, this study selected the most suitable $CO_2$ sensor for a multi-mobile measurement device. Using this sensor, the authors developed a portable $CO_2$ measurement device that can measure and record temperature, humidity, air pressure, and GPS data as well as $CO_2$ concentration. The authors evaluated the accuracy of this device by measuring the $CO_2$ concentration in a school lecture room and by comparing it with the $CO_2$ concentration measured by a highly accurate $CO_2$ analyzer, denoted LI-6262. The $CO_2$ data, when corrected for simultaneously measured temperature, water vapor partial pressure, and atmospheric pressure, showed a good correspondence with the data measured by the above highly accurate $CO_2$ analyzer. The study indicates that acceptable accuracy can be realized using the calibration method developed by the authors. In fact, the authors consider that this can be made via a portable device that allows measurements to be made while walking and cycling. The above can be used to measure the actual second quantity of pollutant emitted by the device 12.

A further alternative for determining or estimating the actual second quantity of pollutant emitted during operation of the device(s) 12 is provided at steps S45 and S46 in FIG. 2b. Step S45 involves obtaining/determining the actual conditions of use of the device and technical information related thereto so as to obtain fuel consumption. The following again applies where device 12 is an automobile. It is well-known that at a time-independent speed, the speed dependence of fuel consumption in a vehicle attains a minimum at speeds about 50-70 km/h. Therefore, an average speed is a usual attribute for a reliable assessment of fuel consumption in vehicles from measurements of GPS probe vehicle traces. However, it is also well-known that fuel consumption of a vehicle depends crucially on vehicle acceleration: Usually, at a given speed, the higher the vehicle acceleration, the higher the fuel consumption of the vehicle. There are many methods in which fuel consumption has been calculated as a function of speed and acceleration (deceleration) through the use of measurements of engine characteristics together with simulations of driver behavior.

Recently, based on a large number of measurements of fuel consumption in floating car data (FCD), Kerner et al. (Boris S. Kerner, Physik von Transport and Verkehr, Universitat Duisburg-Essen, 47048 Duisburg, Submitted on 26 Oct. 2014, Germany) have found a "pure" empirical microscopic matrix: The matrix has been derived with the use of measured data only, i.e., without any models and simulations. This empirical matrix presents microscopic empirical fuel consumption as a function of microscopic (single-vehicle) speed and acceleration (deceleration). This matrix can be used for many ITS (Intelligent Transportation Systems) applications.

However, due to an error (such as a loss of signal) in the determination of the vehicle location in GPS probe vehicle traces, it is difficult to determine real vehicle acceleration as a time-function with measurements of the GPS traces. Therefore, in addition to the attribute "average vehicle speed", for an assessment of vehicle fuel consumption on a link of a traffic network researches have suggested several attributes. These attributes should be found with the use of the GPS traces, like the number of vehicle stops on a link of a traffic network, kinetic energy of vehicles, etc.

In the above paper written by Kerner et al., the authors introduce an attribute of GPS probe vehicle data that they call "cumulated vehicle acceleration". "Cumulated vehicle acceleration" together with the well-known attribute of GPS probe vehicle data called "average vehicle speed" should allow to perform a reliable assessment of vehicle fuel consumption on a link of a traffic network.

This cumulated vehicle acceleration can be obtained via devices like those provided by the TomTom Company. The field of application of this method is the reduction of vehicle consumption in traffic and transportation networks and could also be considered for the present invention to measure fuel consumption.

Step S46 involves estimating the actual second quantity of pollutant emitted by the device taking into account the above obtained actual conditions of use of the device and technical information related thereto (fuel consumption data based on GPS information and vehicle characteristics) by considering perfect fuel combustion conditions based on the obtained fuel consumption.

A variant to step S46 may envisage to firstly send (step S47) the obtained actual conditions of use of the device and technical information related thereto (consumption information) to at least one sub-system, such as subscribing system 18, payment system 20, certifying system 22 and/or offsetting system 24, which sub-system then processes the transmitted consumption information (step S48) to obtain or estimate the second quantity of actual pollutant emitted due to operation of the device 12 in the manner described above. Obtained consumption information may be transmitted, e.g., by a communication module dedicated to or associated with the device 12 or via an intermediary communication element in the chain of transmission such as a smartphone.

Step S41, S44 or S46 is followed by step S400 at which the obtained/measured/estimated actual second quantity of pollutant emitted due to operation of the device is transmitted to at least one sub-system, such as subscribing system 18, payment system 20, certifying system 22 and/or offsetting system 24. This transmission may be accomplished, e.g., by a communication module dedicated to or associated with the device 12 or via an intermediary communication element in the chain of transmission such as a smartphone or other portable communication device.

It will be understood that the foregoing steps described in connection with determining or estimating the actual second quantity of pollutant emitted during operation of the device(s) 12 may be performed on a continuous, periodic or occasional basis during operation of device 12. Thus, for example, the sequence of steps S40, S41 and S400 may be performed on a continuous, periodic or occasional basis during operation of device 12. Similarly, the sequence S40, S42 and S43; the sequence S44, S400; the sequence S44, S46, S400; the sequence S45, S46, S400; or the sequence S44, S47, S48 may be performed on a continuous, periodic or occasional basis during operation of device 12.

Each of steps S43, S400 and S48 optionally is followed by a checking step S49 at which the system performs a checking procedure, optionally at a predetermined frequency, to check various account information such as whether the bank account is sufficiently supplied with respect to a predetermined amount of money or threshold, whether the subscription is still valid, whether the bank account still exists, or whether any device associated with the subscribed account has been reported stolen, etc. This checking step may be performed by one or more of subscribing system 18, payment system 20, certifying system 22 and offsetting system 24, preferably by subscribing system 18. The checking procedure may be based in part on the method of payment selected and the threshold in case of prepayment. Checking step S49 may be performed on a continuous, periodic or occasional basis during operation of device 12, which basis may be the same as or different than the frequency at which the immediately previous steps are performed in connection with determining or estimating the actual second quantity of pollutant emitted during operation of the device(s) 12.

If checking step S49 is favorable, the process goes to next step S490 at which the system processes information so as to update the subscriber account corresponding to the quantity of emitted pollutant which has been obtained/measured/estimated during operation of the device 12.

The process depicted in FIG. 2b then returns to step S330 already described. In parallel, step S490 is followed by step S50 during which a GHG offset certificate may be generated and transmitted, e.g. by the certifying system. Such certificate may be transmitted to the command module associated with the device, to the previously described portable communication device, or to any other destination adapted to receive the transmitted certificate. At step S52, implementation of an offset for offsetting part or all of the quantity of pollutant emitted due to operation of the device 12 is undertaken. The quantity or value of offset undertaken will be based upon the details of the subscription and mode of operation, e.g. the selected offset factor and amount paid.

Reverting to step S330, a right sub-branch relating to operation of the device 12 on a pollutant non-offsetting mode may be implemented at step S60 by transmitting a signal in response to an input of information or data to the system representing a selection of a pollutant non-offset mode to be used during the current operation of the device. Such non-offset mode selection signal may be implemented, e.g., via the inputting element or unit associated with the device(s) 12, or via the previously described portable communication device such as a smartphone. A non-offset mode selection signal may be transmitted to and processed by any of the previously described sub-systems, preferably subscribing system 18 or payment system 20, most preferably subscribing system 18. Alternately, step S60 is implemented as a default based upon a lack of any input of information or data corresponding to selection of either an offset or non-offset mode.

The above selection of a pollutant non-offset mode may be made previously (through user or subscriber input), e.g. during one of the above steps S1 to S10 or between any two of these consecutive steps.

Optionally, step S60 may automatically cause the sending of a non-offset status information signal (step S38) to information system 14 during operation of the device 12. As previously described, a non-offset status information signal may be chosen to indicate that a pollution-offset procedure has not been implemented, e.g. in the form of an illuminated red light. In that instance, information system 14 will make it known that the pollutants emitted due to the current operation of device 12 are not offset. Such information also may help to change the habits and behavior of other people in the short, mid or long term. The non-offset status information signal may be transmitted from or by one or more sub-systems including, for example, subscribing system 18, payment system 20, certifying system 22, offsetting system 24, communication apparatus 13 or device 12 itself. More preferably, the non-offset status information signal is caused to be transmitted to information system 14 by subscribing system 18 or apparatus 13 or device 12.

Alternatively, the non-offset status information signal is caused to be transmitted to information system 14 by communication apparatus 13 (or by device 12) after being transmitted first from one sub-system to communication apparatus 13 (or to device 12). To be noted that non-offset status information signal may be generated by one or more sub-systems including, for example, subscribing system 18, payment system 20, certifying system 22, offsetting system 24.

Further possible details of implementation of the invention will be described in relation with FIG. 5a and may complete the present description.

Step S60 optionally is followed by steps S62 to S600 which may be performed even though no pollutant offset program has been activated. These steps are essentially identical to steps S40 to S400 already described above and therefore will not be repeated here.

Step S65, S600 or S70 is followed by step S72 at which the system processes the information obtained at the preceding step so as to update the subscriber account corresponding to the quantity of emitted pollutant which has been obtained/measured/estimated during operation of the device 12.

In the event that a result of performing step S49 is unfavorable, such as in the event of an insufficiently supplied account, the process in FIG. 2b proceeds to step S80 at which the system sends an information message e.g. to the user or subscriber via a communication module or portable communication device associated with the pollutant-emitting device 12, prompting input of account information to the system in the manner described in connection with step S34. Based upon any such inputted information, the account is updated in a manner as already explained in connection with step S9 above, e.g. by crediting account from one of possible payment methods or providing the necessary authorizations for being debited subsequently from a predetermined amount.

In parallel, steps S490, S50 and S52 optionally are carried out again for the pollutant quantity paid for in order to generate and transmit a certificate and offset for this quantity.

Step S80 also may be followed by a test step S82 which is carried out on the account in the manner as explained above at step S49.

If the account has been sufficiently funded, then the process returns to step S330 already described.

In the event that steps S80 and/or S82 are omitted or result in an unfavorable account status, step S83 is performed at which a payment deactivation signal is generated such that the payment procedure is deactivated. The process then proceeds either to the right sub-branch (non offset mode) after step S60 or is followed by a step S84 at which an interrupt command is generated which interrupts the transmission of the offset status signal to information system 14.

The other steps S62 to S72 in the right sub-branch are then repeated in the manner explained above.

It is to be noted that the steps S15, S35 (optionally S16, S36) and S11, S60 corresponding to the transmission of an offset mode signal or non offset mode signal (activating or deactivating an offset mode) may be performed at a first predetermined frequency.

The steps corresponding to sending of data or information relating to consumption (S22, S23, S42, S47, S400, S64, S69 and S600) may be performed at a second predetermined frequency.

The above-described process may take place several times during operation of device 12 and terminate when the operation of the device is stopped.

The described method and system according to this embodiment of the invention provide several advantages, including:
- a simple command has to be activated/selected in order to initiate the offsetting program in real time and anywhere (when operating the device); this is done in a safe and simple manner, e.g. through one human machine interaction only (ex: one button/key to press or touch);
- the method allows to certify that authenticated pollutants emissions are automatically offset once a user of a device decides to offset his carbon footprint when using his/her device; this is not a declarative process;
- the method allows to activate/enter into/implement a pollutant offset program in exchange for payment or pre-payment and make it known in the course of use/operation of a pollutant-emitting device; such a program aims at offsetting in a certified or certifiable manner at least part of the quantity of the pollutant(s) emitted by the device;
- when subscribing to the offset program a choice is possible as to the type and location of the offset program; choosing the location for offsetting means for example that the offset project is funded near the place where GHG (pollutants) are emitted;
- the automatic emission or communication of information through information system 14 increases the awareness of people about the link existing between the habits of use of a device and the associated GHG (pollutants) emission;
- the system and method according to the invention make it possible for achieving a neutral carbon footprint, which will not be reachable only via car engine improvements; further, the implementation of the system and method according to the invention is dramatically much more affordable for car manufacturers compared to the investments required to improve car engines in order to reach the next European standard of 95 g $CO_2$/km (current estimation by Alix Partners of 2,000€/vehicle);
- the device (e.g. a car) may get an increased value since it can be seen as a negative GHG (ex $CO_2$) emitter and therefore be considered as a useful tool to fight against climate changes instead of only being considered as a pollutant emitter;
- using the above method will help the user enter into a low GHG (ex $CO_2$) economy with a new value chain and new services such as granting advantages to a driver when driving in a net offset mode (price reductions at tolls on highways and in parking areas, fiscal advantages accorded by the government, etc.).

It is to be understood that in an alternative embodiment the FIGS. 2a-b flowcharts may also apply to other devices or processes that consume a primary product and emit pollutant(s).

In such an alternative embodiment steps S1 to S10 can be taken over as such and steps S11 to S27 omitted. Steps S30 to S600 can be taken over subject to some changes in the content of some steps in order for them to be adapted to another device or process that consumes a primary product other than fuel and emit pollutant(s).

The same advantages as those laid out in connection with FIGS. 2a-b flowcharts also apply to this alternative embodiment except when such advantages are specific to a fuel-consuming device or process.

Figure 2C:
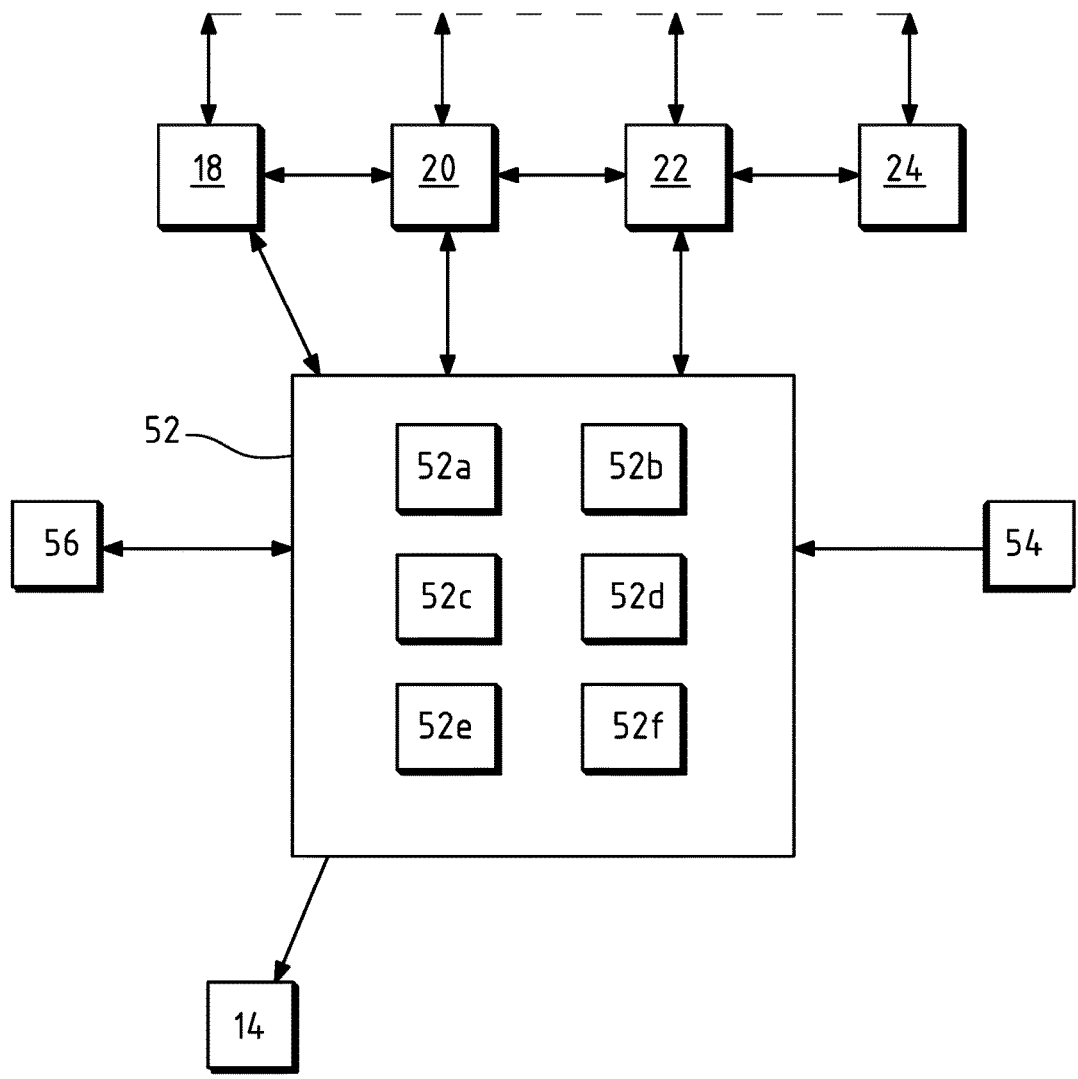
FIG. 2c is a schematic diagram of a system in accordance with an embodiment of the invention.

FIG. 2c illustrates an embodiment of a system 50 in accordance with the described invention for use in connection with an automobile.

The system of FIG. 2c comprises:
the same sub-systems 18 to 24 as described above in connection with FIG. 1a;
an automobile 52 corresponding to device 12 in FIG. 1a;
information system 14 as described in connection with FIG. 1a, e.g. information system 14b based on light emission (although other systems 14a, 14c and 14d may be envisaged alternately or in addition to system 14b) which may be located in or associated with the automobile so as to be visible from inside or outside the automobile when driving (for example, information system 14b which may include a light button may be placed at a location which does not disturb the driver);
optional fuel supply unit 54 corresponding to supply unit 16 as described in FIG. 1a, such as a pump station.

The automobile 52 may include various units/modules or elements which are configured to implement and/or perform at least some of the different operations/steps illustrated in FIGS. 2a and 2b, such as:
a communication module comprising a transmission unit 52a and a receiving unit 52b (e.g. a SIM card embedded in the car electronic system),
a measurement unit 52c for measuring the quantity of fuel consumed by the car,
a determination/measurement unit 52d for determining/measuring the quantity of GHG, e.g. $CO_2$ emitted by the car,
a calculator 52e for performing the necessary calculations required by the operations/steps illustrated in FIGS. 2a and 2b and, in particular, the determination of the emitted GHG,
one or more selectors 52f, e.g. a button or tactile key on the car dashboard as, e.g., the "Ecodrive button" on some car models (BMW, etc.), in order for the driver to input a selection command corresponding to a GHG offset program mode and possibly an offset factor.

The system 50 may also include a smartphone 56 or other portable communication device which is configured to communicate with the car, e.g. via Bluetooth, for example to implement a recognition process for identifying the identity of the user/operator (if the user/operator is not the associated subscriber).

As a variant, the communication module comprising units 52a and 52b may be replaced by a dongle OBD II (plugged into the vehicle) in communication with smartphone 56.

This system functions in accordance with the basic configuration of the invention, namely automatically communicating or transmitting offset incentivization information in real time during operation of the device 52, based on an offset or non-offset status electronic signal identifying the device in unique manner. This signal is automatically transmitted to information system once the device has been detected as operated and has been identified as an authorized device to be used in association with a previously registered subscriber's account. Further details can be found on this method and associated system in the description of FIGS. 5a to 8.

The above-mentioned system 10 in FIG. 1a may also be applied to pollutants contained in waste water emitted by devices that utilize water and produce water pollutants. Such devices may lie in the domestic field such as sanitary devices (e.g. toilets, bathtubs, wash basins, etc.) and household appliances (e.g. washing machines, dishwashers, etc.) or may be other devices as tractors, etc.

Such devices may also lie in the industrial field and transform water by adding therein pollutants.

Water pollutants may be organic or non organic.

By way of example, organic and non organic water pollutants are listed as follows:

Organic: Detergents, Disinfection by-products found in chemically disinfected drinking water, such as chloroform, Food processing waste, which can include oxygen-demanding substances, fats and grease, Insecticides and herbicides, a huge range of organohalides and other chemical compounds, Petroleum hydrocarbons, including fuels (gasoline, diesel fuel, jet fuels, and fuel oil) and lubricants (motor oil), and fuel combustion byproducts, from storm water runoff, tree and bush debris from logging operations, volatile organic compounds (VOCs), such as industrial solvents, from improper storage, chlorinated solvents, which are dense non-aqueous phase liquids (DNAPLs), may fall to the bottom of reservoirs, since they do not mix well with water and have a greater density, than water, polychlorinated biphenyl (PCBs), trichloroethylene, perchlorate, various chemical compounds found in personal hygiene and cosmetic products, drug pollution involving pharmaceutical drugs and their metabolites.

Non organic: Acidity caused by industrial discharges (especially sulfur dioxide from power plants), ammonia from food processing waste, chemical waste as industrial by-products, fertilizers containing nutrients-nitrates and phosphates-which are found in storm water runoff from agriculture, as well as commercial and residential use, heavy metals from motor vehicles (via urban storm water runoff) and acid mine drainage, silt (sediment) in runoff from construction sites, logging, slash and burn practices or land clearing sites.

Figure 3:
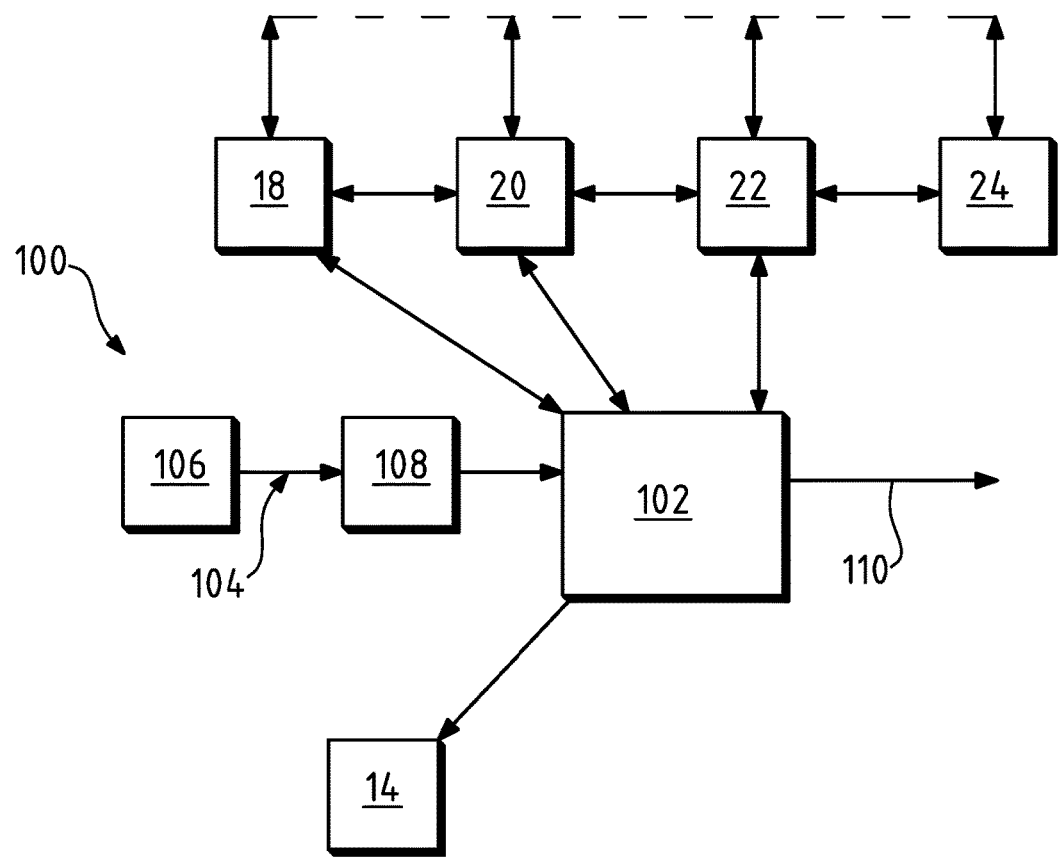
FIG. 3 is a schematic diagram of a system in accordance with another embodiment of the invention related to emission of one or more pollutant(s) in water.

FIG. 3 is a diagrammatic view of a system adapted to the management of water pollutants according to an embodiment of the invention.

The system 100 comprises a device 102 which receives at one of its inputs water supplied through a supply line 104 from a source 106 (e.g. water supply network, reservoir, etc.).

A water meter 108 is mounted on the supply line 104 in order to measure the volume of water flowing through the line 104 and that is injected into the device 102.

At one of the device's outputs polluted water is evacuated through an evacuation line 110.

The system 100 may comprise all the other elements or components illustrated in FIG. 1a, including: information system 14, subscribing system 18, payment system 20, certifying system 22 and offsetting system 24. Certain systems may be omitted or merged together into a single system.

It is to be noted that the device 102 may comprise a plurality of devices analogous to devices 12a-n in FIG. 1a and/or units/modules or elements as 52a-f in FIG. 2c, and information system 14 in FIG. 3 may comprise one or more of the information systems 14a-d as described in connection with FIG. 1a.

The device 102 represents any device that consumes or otherwise utilizes water for its functioning/operation and that is capable of injecting/adding/generating pollutants into the supplied water in particular, due to its functioning process. Such a device (e.g. tractor, individual house, chemical unit, etc.) generates polluted water which is emitted in its environment: water network, landscape (rivers, soils, etc.).

Figure 4:
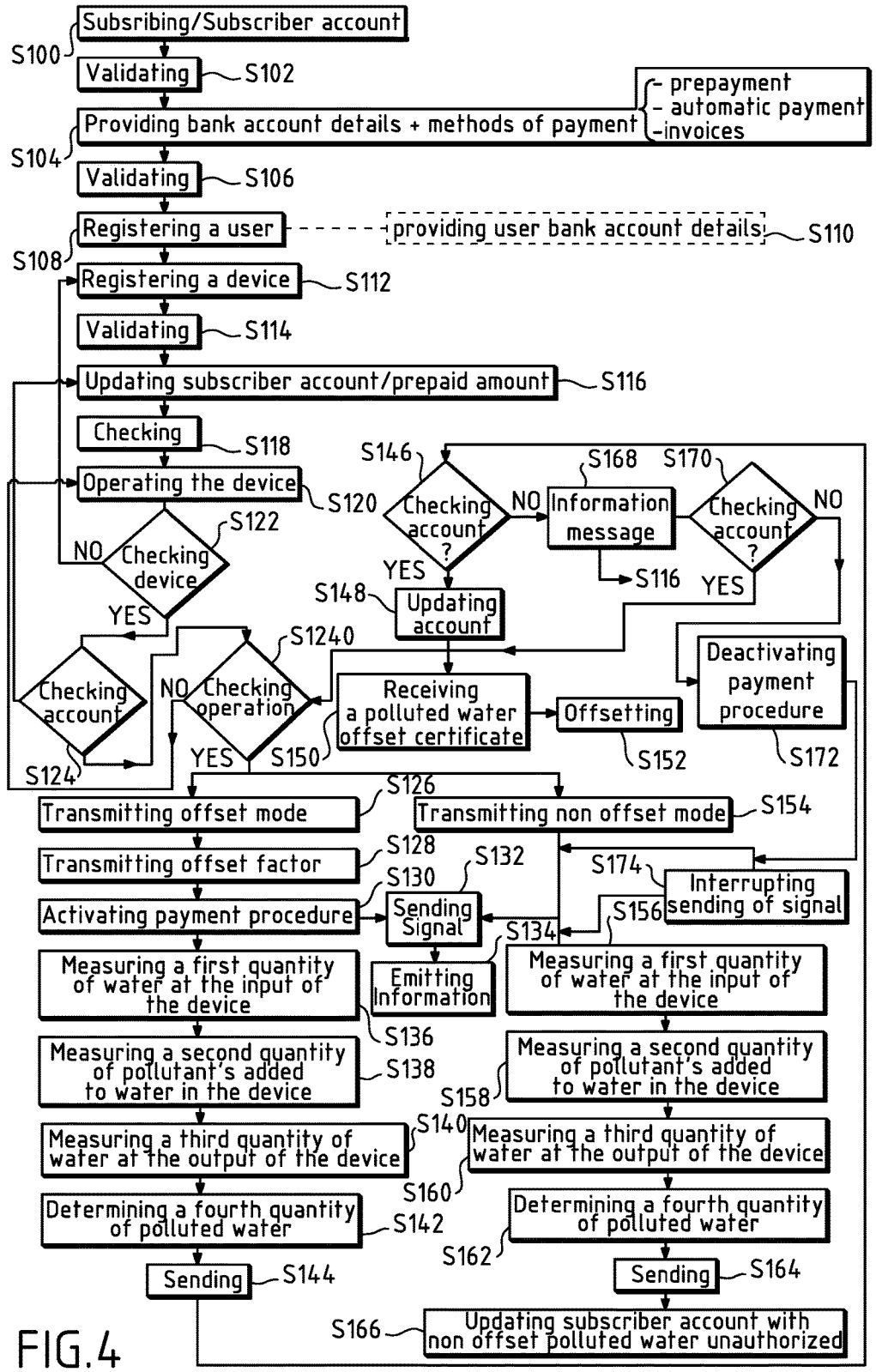
FIG. 4 illustrates a process diagram in accordance with an embodiment of the invention related to emission of one or more pollutant(s) in water.

System 100 may function according to a method for managing water pollutants that is illustrated on the flowchart of FIG. 4 now described.

The steps S100 to S118 are analogous to steps S1 to S10 of FIG. 2a and enable the setting up of the first steps of a polluted water offset program (creation of a subscriber/user account and funding of the account and registering the device(s) 102).

The following steps S120 to S1240 are analogous to steps S30 to S330 of FIG. 2b, except that steps S32 and S34 are respectively included in steps S122 and S124 of FIG. 4. Remarks made in connection with the order of steps S31, S33 and S330 also apply here.

Once test step S1240 has been performed, two branches may be envisaged depending on the user's decision to use the device with or without offsetting the pollutants emitted due to operation of the device.

In case the user decides to enter into an offsetting strategy steps S126 to S130 are carried out analogously to steps S35 to S37 of FIG. 2b or to the variant embodiments described in relation with these steps (and their possible suppression).

Likewise steps S132 and S134 (analogous to steps S38 and S39 in FIG. 2b) are automatically performed to communicate, in real time (during operation of the device) through information system 14 on the fact the device 104 entered in an active process leading to offsetting in part or in whole the pollutants rejected by the device. The same remarks and variant embodiments explained in relation with steps S38 and S39 also apply here.

Subsequent to step S130 corresponding to activation of the payment procedure, several following steps are performed:

- step S136 is a measuring step that measures the volume of water injected into the device 102 through supply line 104; water meter 108 measures a first quantity of water entering at the input of device 102;
- step S138 is a measuring step that measures a second quantity of pollutants that are added to the water due to operation of the device; this quantity of pollutants introduced in the device may be known;
- step S140 is a measuring step that measures the volume of water exiting the device 102 through evacuation line 110; this measurement may be performed by an additional water meter (not represented) located on the evacuation line 110 close to the device output;
- step S142 is a determination step that determines a quantity of polluted water at the output of the device based on the previous values obtained at steps S136, S138 and S140; in particular, this step is roughly based on the volume of water exiting the device and the measured amount or quantity of pollutants; in case the resulting measured/calculated values fall within quality ranges that define acceptable values for the measured parameters, then the pollutants need not be offset; if the resulting measured/calculated values fall outside the quality ranges, then step S142 determines an amount of waste water polluted that needs to be offset.

Next step S144 sends this amount to one or more of subscribing system 18; payment system 20; certifying system 22 or offsetting system 24.

The following steps S146 and S148 are analogous to steps S49 and S490 in FIG. 2b: after testing the subscriber account is updated with the offset water polluted the quantity of which has been obtained. The account is therefore deducted from the offset amount.

Next the flowchart returns to step S130 already described and, in parallel, steps S150 and S152 (similar to steps S50 and S52 of FIG. 2b) are carried out to transmit (and optionally received by the user, e.g. through the device or his/her smartphone) a polluted water offset certificate and offset the amount of polluted water the user has paid for.

Reverting to the right branch following step S124, step S154 is performed analogously to step S60 in FIG. 2b, steps S132 and S134 are automatically performed to make it known publicly in real time (during operation of the device) that the device 102 is being used without offsetting as explained in steps S38 and S39. The same remarks and variant embodiments explained in relation with step S60 and following steps S38 and S39 also apply here.

Next the steps S156, S158, S160, S162 and S164 analogous to steps S136 to S144 described above are performed even though the non offset mode has been selected.

Step S166 updates the account with the non offset amount obtained at the previous steps.

Step S146 (analogous to step S49 in FIG. 2b) is followed by successive steps S168 (followed by steps S116 and S170), S170, S172 and S174 which are analogous to steps S80 (followed by steps S9 and S82), S82, S83 and S84 in FIG. 2b, the description of which will not be repeated here.

This terminates the flowchart of FIG. 4.

The above-described process may take place several times and terminate when the operation of the device 102 is stopped.

Regarding the measurements made with reference to above steps S138, S140 and S142, the following may be applied.

Common physical tests on water include temperature, solids concentrations (e.g., total suspended solids (TSS)) and turbidity. Water samples may be examined using the principles of analytical chemistry. Many published test methods are available today for both organic and inorganic compounds. Frequently used methods include the measurement of Turbidity (TU), Oxidation Reduction Potential, (ORP), Electrical Conductivity (EC), pH, biochemical oxygen demand (BOD), Chemical Oxygen Demand (COD), nutrients (nitrate and phosphorus compounds), metals (including copper, zinc, cadmium, lead and mercury), oil and grease, total petroleum hydrocarbons (TPH), and pesticides.

It is known from the document entitled "Embedded based real-time monitoring and contamination detection in drinking water distribution system" (J. Ramprabua nd C. Paramesh, Volume 3, Issue 5, September-October 2014 Department of EEE, Kumaraguru College of Technology, Coimbatore, International Journal of Emerging Trends & Technology in Computer Science) a proposed system consisting of several in-pipe water quality sensors with flat measuring probes and on-line analyzers. Such a system is low cost, lightweight and capable of processing, logging and provide or display data at a remote location. Such implementation is suitable for large deployments enabling a sensor network approach for providing spatiotemporally rich data to water consumers, water companies and authorities.

The document entitled "AWARE—Reducing pesticide-related water pollution by improving crop protection Practices: the use of embedded ICT technologies" (Douchin M., de Rudnicki V., Ruelle B., Bellon-Maurel V., Pasi, International Conference: Sep. 15-17, 2008 Ragusa—Italy, Cemagref—UMR ITAP) highlights a project in which has been developed a prototype embedded pesticide geo-referenced data recorder for tractors and sprayers used by wine growers.

That monitoring device records precisely the amount and type of chemical substances used during the spraying season. The project also constructed an environmentally friendly pesticide filling station and fitted all tractors used with rinsing tanks. The data recorder and data processing software were tested on 21 French- and Spanish-owned sprayers. It is estimated that the monitoring device could reduce pesticide use by 50% at the early vegetation stage and 30% with grown vegetation, thereby allowing a 30% reduction in pesticide lost in the ground. For instance the quality ranges used at step S142 described above may be applied to the following parameters with the corresponding quality range:

Turbidity: 0-5 NTU
ORP: 650-800 mV
Nitrates: <10 mg/l
Free residual chlorine: 0; 2-2 mg/l
pH: 6.5-8.5
Electrical Conductivity: 500-1000 µS/cm.

The method and associated system for managing the emission of water pollutants rejected by a device provide the same advantages as those indicated above for the management of GHG emission and, more generally, for the management of pollutant(s) emission.

Figure 5A:
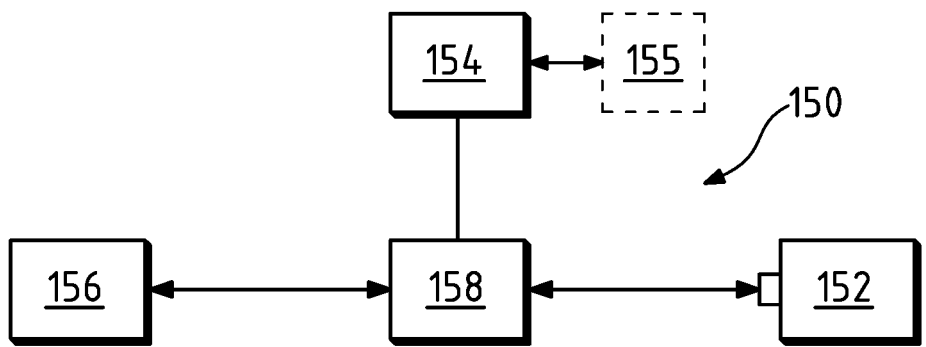
FIGS. 5a-c are schematic diagrams of several systems in accordance with different embodiments of the invention.
Figure 5B:
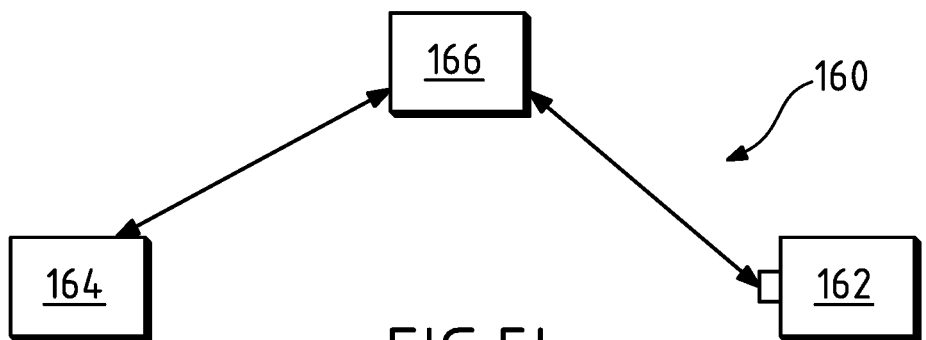
Figure 5C:
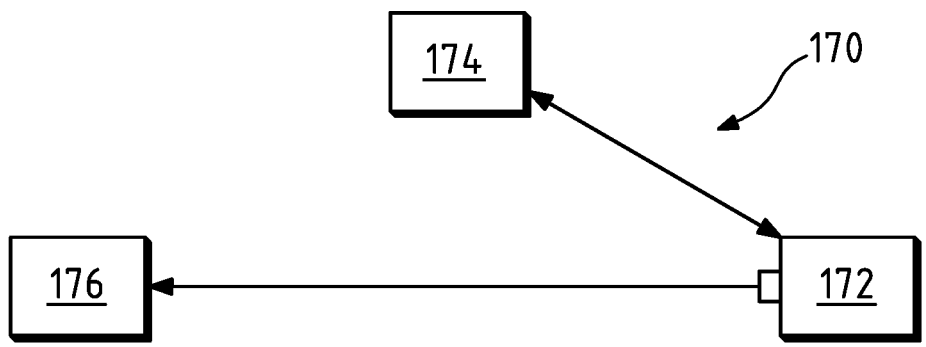

FIGS. 5a-c illustrate several embodiments (according to different structural and/or functional configurations) of a system for incentivizing management or reduction of emission of one or more pollutants in connection with operation of a pollutant-emitting device according to the invention.

The system 150 of FIG. 5a embodiment comprises:
a pollutant-emitting device 152 that may be previous described device 12 or another one,
a first sub-system or entity 154 (such a sub-system or entity may be e.g. a server) that is not in direct communication with device 152,
at least one information system 156 that may be information system 14, more particularly any of systems 14a-d or several among them,
a second sub-system 158 that is in direct communication with the device 152 and also in direct communication with sub-system 154 for cooperating therewith.

Second sub-system 158 is a communication apparatus that may be a portable one such as a smartphone, a tablet, a connected watch, a dedicated connected communication device, or any connected apparatus that is capable of communicating data through communication networks such as the Internet; alternately, such a communication apparatus may be a computer that is specially programmed and adapted to communicate data through communication networks such as the Internet. Second sub-system 158 may be the above described communication apparatus 13 or not.

In this embodiment, second sub-system 158 is considered as a smartphone and device 152 as a vehicle such as an automobile for the sake of simplicity of the description. However, the description also applies to other possible sub-system and device. In the case of a vehicle the different elements or components described in relation with FIG. 2c or at least some of them can be taken over here. For instance the vehicle can be equipped with a communication module such as a dongle OBD2 (plugged into the vehicle in an appropriate plug) and that is in direct communication with smartphone 158 e.g. through a Bluetooth wireless communication. Dongle OBD2 may be interrogated by smartphone 158 (through requests sent to dongle OBD2) and then reads data specific to the vehicle and available thereon. Such available data is in conformity with international standards and may be, e.g. the fuel consumption, speed of the vehicle, engine speed, engine temperature, identity of the vehicle (e.g. VIN for "Vehicle Identity Number"; this number uniquely identifies each vehicle throughout the world), etc.

Figure 6:
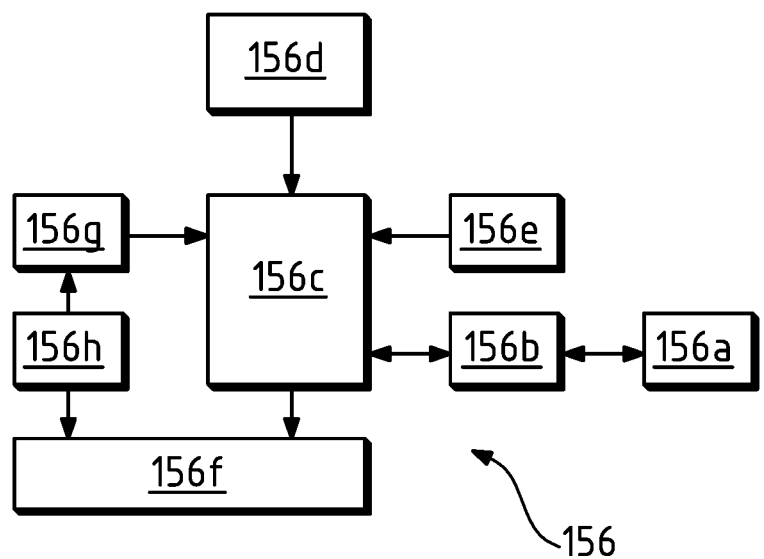
FIG. 6 is a more detailed representation of the information system of any of FIGS. 5a-c.

FIG. 6 is a schematic diagram of a possible configuration of information system 14.

FIG. 6 takes over some of the components/units/modules illustrated in FIG. 1b.

In particular, information system 156 includes a communication unit or module which comprises a transmitting/receiving unit in particular for receiving an offset status information signal (or non-offset status information signal). This unit may use, e.g. Bluetooth or Wifi transmission or the like. Here, it is a Bluetooth unit which comprises an antenna 156a and a BLE ("Bluetooth Low Emitter") emitter 156b.

Information system 156 further includes:
a data processing unit 156c or microprocessor associated with a flash memory unit and a RAM unit not represented but similar to units 32 and 33 in FIG. 1b;
an accelerometer 156d;
a luminosity or light sensor 156e;
light elements or units 156f such as several LEDs which are arranged in parallel so as not to require a too high voltage;
a battery unit 156g which receives as an input electrical power from a power charger 156h; battery unit 156g supplies electrical power to unit 156c while power charger 156h supplies electrical power to light elements or units 156f.

Data processing unit 156c is both configured to receive data or signal(s) from sensors 156d and 156e as well as from communication unit 156a-b and provide light elements or units 156f with appropriate activation or driving commands depending on the above different received data or signals. To be noted that sensors 156d and 156e are optional and, in the basic configuration, processing unit 156c only receives status data or signal(s) from communication unit 156a-b.

In the present description information system 156 is on-board the vehicle 152. However, in other embodiments, the information system 156 (or another information system) may be located at a distance from the vehicle.

By way of example:
units 156b and 156c may be integrated in a chip called surface-on-the chip commercialized by Texas Instrument under the commercial reference CC2650;
the antenna 156a is printed on the printed circuit board directly;
the accelerometer 156d may be a sensor commercialized by STM under the commercial reference FM89/SC444/PF252928;
luminosity or light sensor 156e may be a sensor commercialized by Texas Instrument under the commercial reference OPT3001;
LEDs 156f may be in the number of eight with green light and commercialized by Kingbright under the commercial reference KPTD-3216MGC;
battery unit 156g may be a lithium ion battery with a 2200 mAh current.

More generally, lighting of the LEDs may take into account the place of use of the vehicle, the day and even the context of use (e. g. a first color may be used for a 100% offset mode, a second color for a 200% offset mode, a third color for week-ends or even days etc.).

FIG. 6 illustrates different units/components/modules that may be used in the system when an offset status information signal (or non-offset status information signal) is received from a sub-system such as sub-system 158 of FIG. 5a in order to cause light elements or units 156f to emit or communicate or transmit information as described above. To be noted that the present description also applies to any other type of information system 14.

All the elements of FIG. 1*b* have not been taken over in FIG. 6 for simplicity purpose but also apply here where necessary.

An embodiment of the method according to the invention will now be described with reference to FIGS. 5*a*, 6 and 7.

Figure 7:
FIG. 7 is a schematic representation of a possible structure of a status signal.

FIG. 7 schematically depicts an algorithm on which the method relies. The different steps of the method are performed automatically, i.e. without any human intervention, once the vehicle has been operated.

At the beginning of the method a user is in his/her vehicle 152 with his/her smartphone 158 on which an application is executed for incentivizing management or reduction of emission of pollutant(s) in connection with operation of the vehicle.

This application is executed in cooperation with sub-system 154 (ex: server) and other possible sub-systems in which data may be stored and retrieved for implementing the method according to the invention. This application is executed by connecting smartphone 158 to the internet. In particular, sub-system 154 may use such data for performing steps of the method which will be described below. Sub-system 154 comprises data communication capabilities (transmission and reception module(s)), processing capabilities (e.g. a processor) and possible memory resources and may have access to other memory resources (e.g. databases).

The vehicle is operated by the user and detection of operation is performed (step S200). This step is performed by smartphone 158 itself e.g. through its GPS localization application. Alternatively, this can be performed in combination with dongle OBD2. In this case, smartphone 158 detects a Bluetooth signal from dongle OBD2 (recognition of the latter by smartphone) and sends a command or request to the latter in order to know whether the engine is on and to obtain the identity of the vehicle.

Smartphone 158 receives the requested information (vehicle engine is on and identity of the vehicle through e.g. its VIN) at a given instant or time of a day (called "DateTime" in the remainder of the description). Smartphone 158 then communicates with sub-system 154 through the communication network linking them (ex: a mobile phone network such as GSM, UMTS or LTE) to transmit this information (time information and identification information).

Time information represents time at which the vehicle has been detected as operated and identification information provides information on the identity of the detected vehicle under operation and will be designated as "IDD" in the remainder of the description. This communication is established thanks to the above-mentioned application which sets up a secured connection with the subscriber's account. This account has been previously established as explained above in connection with FIG. 2*a*, in particular in the course of steps S1 to S10 or at least some of them.

According to step S202 a check is performed by sub-system 154 for checking the existence of a subscriber's account that has been previously registered by a subscriber for subscribing to a pollutant offset program for offsetting in a certified or certifiable manner at least part of the quantity of pollutant(s) emitted by a pollutant-emitting vehicle.

If no registered account exists, the method cannot proceed any further. Alternatively, the method proceeds as explained above in the description of steps S31 and S32 in FIG. 2*b*.

If a registered subscriber's account has been found, a next step S204 for checking the funding of the account is performed by sub-system 154 and if funding of the account is sufficient for pursuing the process. This check may in particular verifies whether any prepayment procedure has been set up when registering the subscriber's account and if funding of the prepaid account is sufficient for pursuing the process (generally, a minimum threshold has been fixed and under which the method is not authorized to proceed any further).

When performing this check the previous use of the vehicle is taken into account (in particular, the different data associated with the offset of polluting emissions in the course of the last path and the status of the account with respect to the threshold: if the amount of money on the account fell under the threshold, then the account has to be funded again for pursuing the process; this is can be performed as explained above in the description of steps S33 and S34 in FIG. 2*b*).

When registering this account and supplying subscriber's bank account details and selected payment methods (e.g. prepayment, etc.), the subscriber has also selected an operation mode for operating the vehicle under a pollutant offset mode of the pollutant offset program as well as an offset rate factor for offsetting at least part of the quantity of pollutant(s) (e.g. GHG) emitted by the vehicle under operation. The selected operation mode for operating the device under a pollutant offset mode being representative of a pollution-offset procedure that has been implemented in the pollutant offset program. The result of these selection is stored with the data associated with the registered account or in another place. When sub-system consults the registered account it has access to the associated data (e.g. selected mode and offset rate factor, subscriber's bank account details and selected payment methods, history of the previous paths traveled by the vehicle together with associated consumption, quantities of pollutant(s) emitted and offset, etc.).

These selection steps have been explained in detail in the above description of steps S35 to S37 in FIG. 2*b*.

It is to be noted that these selection steps in FIG. 2*b* may alternatively take place in the course of steps S1 to S10 during registration process.

It is to be noted that when funding of the account is not sufficient for the method to proceed further an operation mode for operating the vehicle under a pollutant non-offset mode may be selected by default without any human intervention (this default mode may be entered into in real time during operation of the vehicle after the appropriate checks have been performed).

Next step S206 (performed by sub-system 154) checks whether the detected vehicle under operation is the pollutant-emitting vehicle associated with the above identified subscriber's account. This step makes it possible to detect any possible attempt (possible fraud) to use the method with a vehicle that has not been previously registered as authorized for use in association with the registered account.

This check is done through a comparison between the identified vehicle under operation 152 and the vehicle that has been previously registered as authorized for use in association with the subscriber's account.

When the result of this check is positive, sub-system 154 performs next step S208 for generating an offset or non-offset status electronic signal from information/data transmitted by smartphone 158 and data associated with the registered subscriber's account. This unique signal includes:

identification information (IDD) identifying the detected vehicle under operation, pollutant offset information ("Offset Mode") regarding a selected operation mode for operating the vehicle either under a pollutant offset mode or a pollutant non-offset mode of the pollutant offset program (this information may also include information relating to the context of use of the vehicle and/or the level of efficiency of use of the vehicle and possible other information in relation with the use of the current operation of the vehicle), time information (Date Time) representing time at which the vehicle has been detected as operated.

Figure 8:
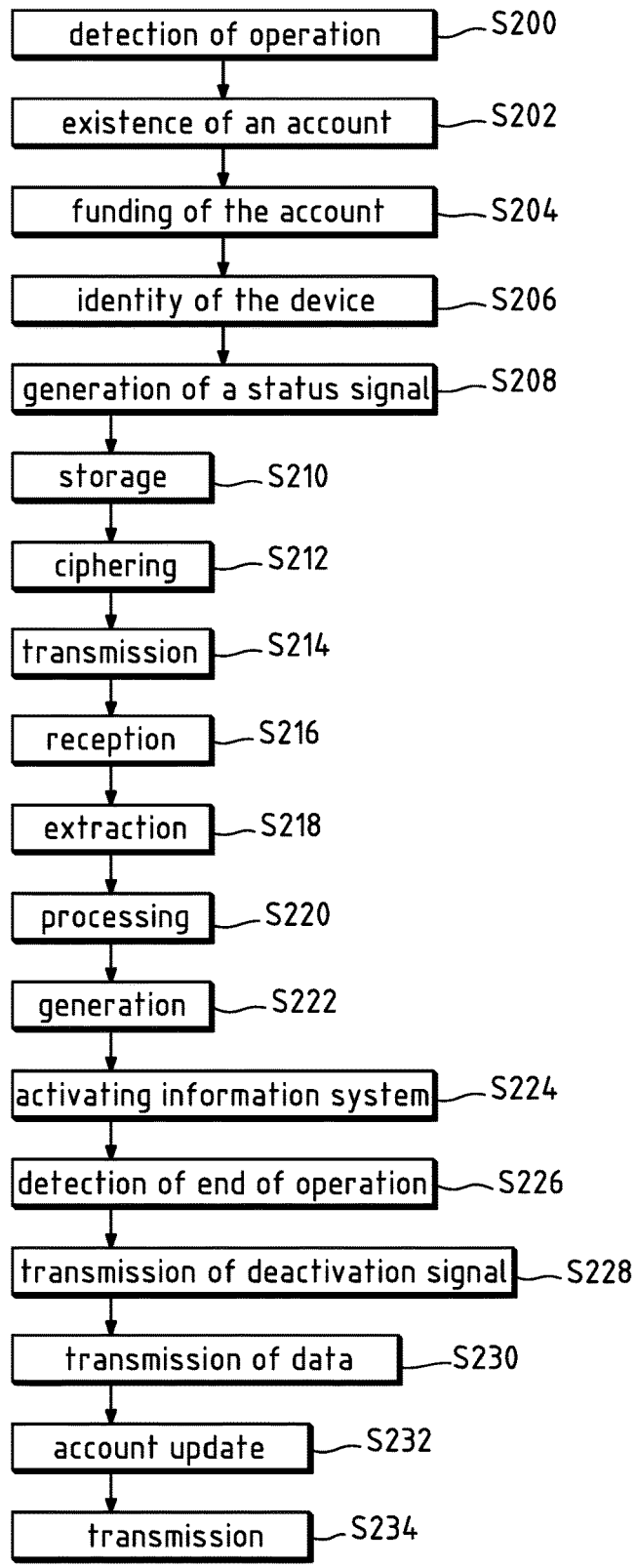
FIG. 8 illustrates a process diagram in accordance with an embodiment of the invention.

The signal may have the structure or format illustrated in FIG. 8, i.e. a string of characters: Data 1-Data 2-Data 3 where:

Data 1 (IDD) may be the VIN of the vehicle which is a string of 17 characters (ex: WDDXXXXXXXXXXXXXX);

Data 2 (Date Time) corresponds to the timing information of the start of the vehicle path of the type AAAAMMJJH-HMMSS, such as 20160303123634, Data 3 (Offset Mode) is the string of characters 0x00 or 0x01 (for offset ON or OFF).

As previously explained, this structure/format may additionally and optionally include other data such as data which are representative of the historical driving behavior of the vehicle (efficiency), the context of use of the vehicle (urban driving, outside town driving, a combination of both), etc.

Sub-system 154 includes a device identifier, a signal generation module/unit and a transmission module/unit.

Data or information contained in this signal (or the signal as a whole) may be stored (S210) either in sub-system 154 or in associated memory resources, in particular it is stored in an authentication entity or sub-system 155 represented in dotted lines on FIG. 5a) that is distinct from sub-system 154 and in communication therewith. This storage may be used for subsequent authenticity check of such data (or the signal itself). Time information may be useful for checking authenticity of subsequent data. This makes it possible to fight against possible frauders.

In the course of a subsequent authenticity check a comparison step will be performed. The comparison will be made between information contained in an electronic signal that is configured to activate information system 156 and the above stored information in sub-system 154 or authentication entity or sub-system 155. The result of the comparison will lead to authenticate the information or data or not. This check may be requested from sub-system 154 or 155.

According to another optional feature, next step S212 makes provision for ciphering the electronic status signal. A possible example of a ciphering process may comprise applying to the string of characters of the signal a hashing algorithm of the type SHA1 for example. The result of this ciphering process is a string of 40 hexadecimal characters called token. This token may have a duration life of several hours or days, e.g. 12 hours.

This ciphered signal may also be stored in the same way as the previous genuine signal.

The ciphered signal is firstly transmitted during step S214 to smartphone 158 (which has detected the operation of the vehicle) and, upon reception by the latter or within a short time (e.g. a few seconds), the signal is secondly transmitted to information system 156. Here two successive transmission sub-steps are envisaged in the course of step S214. However, in a variant embodiment illustrated in FIG. 5b, a single transmission is carried out from sub-system to information system. Transmission here takes place over a Bluetooth network available in the vehicle. However, more generally, transmission may occur on a wireless communication network.

The transmitted signal (in ciphered form according to this optional feature) is received by information system 156, more particularly by communication unit 156a-b thereof (step S216).

Before further explaining the processing of this signal by information system 156, several aspects in relation with the functioning of the latter have to be pointed out.

When the vehicle is not operated information system 156, in particular, data processing unit 156c, is in standby mode in order to save power of such a piece of equipment mounted on-board the vehicle.

The accelerometer 156d is in wake-on-motion mode. When the vehicle is being operated, the accelerometer detects the motion and generates an electrical signal (wake up signal) that is sent to an external input (external interrupt or physical wake input) of the unit 156c (chip) for waking up the latter and communication unit 156a-b.

The Bluetooth Low Energy function of unit 156b is thus activated and a Bluetooth signal is sent on the Bluetooth network available in the vehicle in order to make it known to the apparatus or devices connected to this network that the BLE emitter is activated and is suitable for receiving a signal.

Smartphone 158 is connected to the Bluetooth network and transmits the above status signal as explained above (in particular at step S214).

This transmission is performed under the communication Bluetooth BLE protocol either regularly or not. The signal may be transmitted with a frequency that is higher than the frequency according to which the information system 156 switches off in case no event capable of waking it up has occurred. Information system 156 switches off after a predetermined first time period has lapsed. The signal is thus transmitted several times with a second time period between two successive transmissions that is less (ex:10 s) than the first time period (ex:20 s). The system is thus configured to save power consumption and render the system autonomous in terms of power supply.

The signal as received by information system 156 is firstly deciphered with the appropriate deciphering algorithm by unit 156c.

Data or information is next extracted from the signal (step S218) by unit 156c and processed by the latter (step S220) to generate a command or activation signal for activating the LEDs 156f (step S222). Activating the LEDs means commanding the latter to transmit or emit light information with a predetermined luminosity (offset incentivization information), or more generally, a predetermined luminosity pattern as explained above in the description of FIGS. 1a and 1b. Unit 156c or unit 156b carries out a prior format checking on the received and deciphered signal with respect to a template format stored in memory. This prior check is done to validate the format of the signal so that it is authorized to be further processed according to the method. A further security check may be performed on the identity of the vehicle in case information system has previously obtained this information either from smartphone 158 or sub-system 154 or through another way. Alternatively, identification information on the vehicle may obtained directly by information system 156 in case the latter is integrated in the vehicle by the car manufacturer during the manufacture of the vehicle.

Unit 156c also sends interrogation signals to luminosity or light sensor 156e in order to know the ambient luminosity rate (light external to the vehicle). The sensor measures lumen and may supply an ambient luminosity rate which is either "1" for a high luminosity and "0" for no luminosity. The rate is defined with respect to predetermined thresholds. Alternatively, the determination of an ambient luminosity rate may be performed by unit 156c.

When generating a command or activation signal for activating the LEDs 156f unit 156c takes into account data obtained from sensor 156e so that the command or activation signal activates the LEDs with a value depending on the ambient luminosity. The higher the ambient luminosity, the higher the lighting intensity of the LEDs.

The present situation is quite simple since the useful information extracted from the status signal is only to switch on the LEDs. However, all the cases previously described above in relation with systems 14b-d of FIGS. 1a and 1b may apply here.

More particularly, an activation signal has been generated by the processing unit 156c in order to activate LEDs 156f, in real time during operation of the vehicle, under a progressive or incremental lighting format.

This activation signal (LEDS driving signal) may take the following successive values:

(05,10,15,20,25,30,35,40,45,50,55,60,65,70,75,80,85,90, 95,95,99,99, 99,99,99,99,99,99,99,99,99,99,99,99,99,99,99, 99,99,99,95,95,90,85,80,75, 70,65,60,55,50,45,40,35,30,25, 20,15,10,05,00,00,00,00,00,00,00,00,00,0 0,00,00,00,00, 00,00,00,00,00,00,00,00,00,00,00,00,00,00,00,00,00,00, 00, 00,00,00,00,00,00,00,00,00,00,00,00,00,00,00,00,00, 00,00,00,00,00,00, 00,).

These values are each multiplied by the luminosity rate before the resulting activation signal is sent to the input of LEDs 156f for the activation thereof (S224). Each value is sent every 50 ms and the duration of the whole activation signal is about 6 s. At the end of a signal, before sending a new signal the luminosity rate is updated in accordance with the current value obtained from luminosity sensor 156e. This may modify the resulting activation signal before it is sent to the input of LEDs 156f for the activation thereof. The sending frequency of the values is such that an observer already sees an averaged luminosity. According to the above lightning pattern, the LEDs are switched on over progressively over a first period of time, then the intensity values progressively decrease over a second period. Next, the values are null over a third period (ex; the third period equals the sum of the first and second periods of time).

In a variant embodiment the activation signal (may be not including the information on the ambient luminosity) may be elaborated in another sub-system or entity (e.g. sub-system 154 or smartphone 158) and subsequently transmitted to information system 156.

When the vehicle path is over (vehicle 152 has arrived at its destination) smartphone 158 detects when vehicle 152 stops, e.g. as explained above for the detection of operation. For instance, smartphone 158 obtains this information through appropriate requests transmitted to dongle OBD2 plugged on to the vehicle. This detection is performed at step S226.

A deactivation signal is then transmitted by smartphone 158 to information system 156 (step S228) in order to deactivate the latter, and therefore switch the LEDs off (in practice, no activation signals are sent to the LEDs). This signal is identical to status signal discussed above except that in Data 3 the string of characters corresponds to "offset OFF".

Alternatively, in the absence of any vehicle motion during the above period of time, information system 156 will enter into standby mode. However, the period of time may be lengthened so as to avoid putting the system in standby mode for a stop at a traffic light for example. Nevertheless, this configuration is more power consuming than the above described one.

Smartphone 158 also obtains other data or information from dongle OBD2 plugged on to the vehicle such as the engine temperature, fuel injection, speed profile on the path, rpm profile on the path, altimetry and other data.

Such data is transmitted to sub-system 154 via smartphone 158 (step S230).

Sub-system 154 then updates the subscriber's account (S232) with the consumption data and also qualifies the driving behavior or habits of the driver (associated with use of the vehicle) and transmits this information to smartphone 158 (step S234).

The above embodiment establishes a closed machine-to-machine loop that ensures security of the incentivization method. When the vehicle 152 has been automatically (i.e. without any human intervention) detected as being under operation the following step aims at checking that this vehicle is the same as the one that has been previously registered within the frame of a pollutant offset program in association with a registered subscription or subscriber account. This check is also performed automatically.

When the result of the check proves that vehicle 152 under operation is the same as the one associated with the previously registered subscription or subscriber account an offset or non-offset status electronic signal may be automatically generated and transmitted to the information system 156. This signal has a function of control on the information system 156, more particularly on the activation or triggering of the transmission of information. When this signal is received by the information system 156 it causes transmission by the latter (automatically) of offset incentivization information in real time during operation of the device.

This status signal uniquely identifies vehicle 152 and its selected offset (or non-offset) mode in relation with the actual consumption (and pollution) of the vehicle. This status signal is transmitted in real time during operation of vehicle 152 and cannot be forged. The different types of information contained in the signal clearly identify the vehicle 152, its way of offsetting and current time or instant at which the vehicle is under operation.

Thus, detection of operation of the vehicle 152 and check of the identity of the vehicle (relative to the previously identified/registered device) may automatically lead to transmission of offset incentivization information in real time during operation of the device.

When the vehicle 152 is being operated information is transmitted in real time via different possible media of communication. This information is representative of the fact that the vehicle is involved in a pollutant offset program and is neutralizing (or not) at least part of the quantity of pollutant(s) currently emitted by said vehicle under operation.

The above-mentioned method establishes a secured link between the vehicle 152 and the information according to which it is being operated under an offset or non-offset mode in a pollutant offset program (in other words a unique link can therefore be established between the pollutant-emitting vehicle 152 and a pollution-offset program via a subscribing/subscriber account). If the vehicle 152 has not being recognized as authorized for use in association with the registered subscription or subscriber account, then none transmission of offset incentivization information in real time during operation of the vehicle can occur.

Time information representing time or instant at which the vehicle 152 has been detected as operated may be useful for subsequent authentication purpose. This information makes it possible to ensure that the vehicle 152 is certified as being neutral or partly neutral (or not neutral at all) since the vehicle 152 is started (ex: on the current path of the vehicle 152 if it is an automobile) thanks to the chain that has just been described. Time information may also be useful for historical purpose for keeping track of different data associated with the current operation of the vehicle 152 (ex: consumption of primary product, quantity of pollutant(s) emitted e.g. on the path, quantity of $CO_2$ offset, etc.).

The above advantages also apply if the device is of another type as already explained above, for other communication apparatus 158 and for other types of information systems as those described above in relation with FIGS. 1a-b and 2a-c. The above advantages also apply to the embodiments described with reference to FIGS. 1a to 4.

The description that has just been made with reference to FIGS. 5a, 6, 7 and 8 may be completed by other aspects that have only been described in relation with previous figures such as FIGS. 1a-b, 2a-c. This remark also applies if the device is not a vehicle.

FIGS. 5b and 5c illustrate possible variant embodiments of the system 150 of FIG. 5a. The description of the method used in connection with system 150 also applies to the method used in connection with systems 160 and 170. The corresponding parts of the description of system 150 also apply to systems 160 and 170. The same advantages as those explained in relation with FIG. 5a also apply here.

The system 160 of FIG. 5b does not use a communication apparatus to both obtain information/data from device 162 and transmit a status signal to information system 164. However, a sub-system 166 plays the role of sub-systems 154 and 158 of FIG. 5a. Sub-system 166 is thus configured to communicate directly both with:
  device 162 for detecting operation of the latter as well as identifying it, and
  information system 164 for transmitting a status signal to the latter and a stop signal when the vehicle has stopped.

Information system 164 is identical to information system 156.

Device 162 may differ from device 152 in that it has communication capabilities for transmitting information/ data to sub-system 166 upon receiving requests from the latter over a wireless communication network that is not a local network such as Bluetooth, Wifi, Low frequency, etc. For example, the dongle OBD2 may be further equipped with a SIM card in order to have the communication capabilities of a connected apparatus such as a smartphone.

In the configuration of FIG. 5c, the system 170 comprises device 172, sub-system 174 and information system 176 that is identical to information system 156.

The system 170 does not use a communication apparatus to both obtain information/data from device 172 and transmit a status signal to information system 176.

However, sub-system 174 plays the role of sub-systems 154 and 158 of FIG. 5a in communicating directly with device 172 for detecting operation of the latter as well as identifying it.

Device 172 may differ from device 152 in that it has additional communication capabilities for transmitting information/data to sub-system 174 upon receiving requests from the latter over a wireless communication network. For example, the dongle OBD2 may be further equipped with a SIM card in order to have the communication capabilities of a connected apparatus such as a smartphone-information system 164 for transmitting a status signal to the latter.

Device 172 has also the same communication capabilities as device 152 in that it is capable of communicating over a local network such as Bluetooth, Wifi, Low frequency, etc. to transmit a status signal to information system 176 and a stop signal to the latter when the vehicle has stopped.

In a variant embodiment, information system 156 of FIG. 5a may be suppressed or maintained and communication apparatus 158 may play the role of an information system as information system 14a in FIG. 1a. Such an information system is suitable for communicating/transmitting information on social networks. This can be done (if the subscriber previously gave his/her consent) thanks to sub-system 154 of FIG. 5a which sends one or several requests (mainly http requests) to an API (Application Programming Interface) of a social network as Facebook (or Twitter, Instagram, etc.) via a server thereof. The subscriber or user of the device must have a registered account within this social network. The requests sent to the selected API enable authentication and then publication of a content on the Facebook profile of subscriber or user of the device. In particular, the published information includes information as to the identity of the vehicle and the real time offset of the emission of pollutant(s) by the vehicle under operation. The information is published while, at the same time, the vehicle is under operation and emits pollutant(s) such as GHGs. Depending on the social network the published content may include texts, images or videos.

To be noted that the sub-systems described in the embodiments of FIGS. 5a to 8 may correspond each to one of the different sub-systems of FIG. 1a, or to several of them. Thus, the sub-systems described in the embodiments of FIGS. 5a to 8 may each concentrate several sub-systems of FIG. 1a.

Other configurations of systems and associated methods can be envisaged within the frame of the invention. The description of the different embodiments also applies when the systems include several devices operated simultaneously or not.

The invention claimed is:

1. A method for incentivizing management or reduction of emission of one or more pollutants in connection with operation of a pollutant-emitting device, said method comprises the following steps performed automatically when the pollutant-emitting device is in operation:
  detecting operation of the device,
  checking whether the detected device under operation is the pollutant-emitting device associated with a subscriber's account that has been previously registered by a subscriber for subscribing to a pollutant offset program for offsetting in a certified or certifiable manner at least part of the quantity of pollutant(s) emitted by the device,
  when the result of the checking step is positive, generating an offset or non-offset status electronic signal, said signal including:
    identification information identifying the detected device under operation,
    pollutant offset information regarding a selected operation mode for operating the device either under a pollutant offset mode or a pollutant non-offset mode of the pollutant offset program, the selected operation mode for operating the device under a pollutant offset mode being representative of a pollution-offset procedure that has been implemented in the pollutant offset program,
    time information representing time at which the device has been detected as operated,
  transmitting said generated offset or non-offset status electronic signal to at least one information system via a wireless communication network, activating the at least one information system from information contained in the transmitted generated offset or non-offset status electronic signal so that said system transmits offset incentivization information in real time during operation of the device, said transmitted offset incentivization information indicating whether a pollution-offset procedure has been implemented or not in the pollutant offset program for offsetting in a certified or certifiable manner at least part of the quantity of pollutant(s) currently emitted by the device under operation.

2. The method of claim 1, wherein said method comprises an identification step for identifying the device under operation from the device itself.

3. The method of claim 2, wherein said method comprises a further comparison step for comparing the identified device under operation with the device that has been previously registered as authorized for use in association with the subscriber's account.

4. The method of claim 2, wherein said method comprises a check step for checking the existence of a subscriber's account that has been previously registered by a subscriber for subscribing to a pollutant offset program for offsetting in a certified or certifiable manner at least part of the quantity of pollutant(s) emitted by a pollutant-emitting device.

5. The method of claim 1, wherein said method comprises a check step for checking whether any prepayment procedure has been set up when registering the subscriber's account.

6. The method of claim 1, wherein the selected operation mode for operating the device under a pollutant offset mode including a selected offset rate factor for offsetting at least part of the quantity of pollutant(s) emitted by the device under operation.

7. The method of claim 1, wherein said method comprises a reception step, performed by the at least one information system, for receiving said transmitted generated offset or non-offset status electronic signal.

8. The method of claim 1, wherein said method comprises a storage step for storing said information contained in the offset or non-offset status electronic signal (in an authentication entity) for subsequent authenticity check.

9. The method of claim 8, wherein said method comprises a comparison step for comparing subsequent information contained in an electronic signal and that is configured to activate said at least one information system with said stored information and checking authenticity of said compared subsequent information.

10. The method of claim 1, wherein the step for activating the at least one information system from information contained in the transmitted generated offset or non-offset status electronic signal further comprises extracting said information from the signal, processing said extracted information and generating at least one command for activating the at least one information system depending on said information.

11. The method of claim 1, wherein the pollutant-emitting device is an automobile.

12. The method of claim 11, wherein operation of said pollutant-emitting device causes emission of greenhouse gases (GHG) produced by consumption of fuel.

13. The method of claim 11, wherein said method further comprises determining or estimating an actual quantity of pollutant emitted during said operation of the device.

14. The method of claim 12, wherein determining or estimating the actual quantity of pollutant comprises one of the following options:

measuring the actual consumption of fuel by the device and obtaining the quantity of actual pollutant emitted by the device based on the measured actual consumption (option A);

measuring the actual quantity of pollutant emitted by the device (option B);

estimating the actual quantity of pollutant emitted by the device taking into account actual conditions of use of the device and technical information related thereto (option C).

15. The method of claim 1, wherein operation of said pollutant-emitting device causes emission of one or more pollutants in water.

16. The method of claim 15, wherein said method further comprises determining an actual quantity of polluted water or pollutant(s) emitted during operation of the device based on a first quantity of water measured at an input to the device, a second quantity of pollutants added to the water in the device, and a third quantity of water measured at an output of the device.

17. The method of claim 1, wherein transmitting an offset or non-offset status information signal is performed in response to one of the following: operating the device or receiving data or information corresponding to selection of an operation mode for operating the device under a pollutant offset mode or a pollutant non-offset mode when the device is operated or checking that the device detected as being under operation is the pollutant-emitting device associated with a subscriber's account that has been previously registered by a subscriber for subscribing to a pollutant offset program.

18. The method of claim 17, wherein said data or information corresponding to selection of an operation mode for operating the device under a pollutant offset mode comprises a selected or designated pollutant offset factor which defines an offset rate for offsetting.

19. The method of claim 1, wherein said at least one information system comprises at least one of the following: a communication apparatus that is adapted to communicate information on one or more communication networks, in particular, on one or more social networks through the Internet; one or more light elements adapted to be illuminated in a predetermined manner; one or more sound elements adapted to generate sound in a predetermined manner; at least one display adapted to display a predetermined message.

20. The method of claim 1, wherein said method further comprises processing, receiving and/or transmitting subscription or subscriber information in connection with a pollutant offset program.

21. The method of claim 1, wherein said method further comprises processing, receiving and/or transmitting data sufficient to generate a certification that a payment or engagement to pay for offsetting a quantity of GHG (Greenhouse Gas) or other pollutant emitted by operation of the device has been implemented.

22. A system for incentivizing management or reduction of emission of one or more pollutants in connection with operation of a pollutant-emitting device, said system comprises:

a signal generation module for generating an offset or non-offset status electronic signal, said signal including:

identification information identifying the device under operation, pollutant offset information regarding a selected operation mode for operating the device either under a pollutant offset mode or a pollutant non-offset mode of a pollutant offset program for offsetting in a certified or certifiable manner at least part of the quantity of pollutant(s) emitted by the device, the selected operation mode for operating the device under a pollutant offset mode being representative of a pollution-offset procedure that has been implemented in the pollutant offset program, time information representing time at which the device has been detected as operated, a transmission module for transmitting said generated offset or non-offset status electronic signal via a wireless communication network, at least one information system that is configured both to receive said transmitted generated offset or non-offset status electronic signal and transmit offset incentivization information in real time during operation of the device from information contained in the received signal, said transmitted offset incentivization information indicating whether a pollution-offset procedure has been implemented or not in the pollutant offset program for offsetting in a certified or certifiable manner at least part of the quantity of pollutant(s) currently emitted by the device.

23. The system of claim 22, wherein said system further comprises at least one pollutant-emitting device.

24. The system of claim 22, wherein said system further comprises at least one sub-system including at least one of the signal generation module and the transmission module.

25. The system of claim 22, wherein said system further comprises at least one communication sub-system that is configured to communicate with the device under operation for identifying the latter.

26. The system of claim 22, wherein said system further comprises at least one communication sub-system that is configured to communicate with the device under operation for detecting operation of the latter.

27. The system of claim 22, wherein said system further comprises at least one sub-system including hardware and/or software specially adapted to process, receive and/or transmit identification information identifying the device under operation.

28. The system of claim 22, wherein said system further comprises at least one sub-system including hardware and/or software specially adapted to process, receive and/or transmit information according to which the device is under operation and/or time information at which the device has been detected as operated.

29. The system of claim 26, wherein said system further comprises at least one sub-system that is configured to check whether the detected device under operation is the pollutant-emitting device associated with a subscriber's account that has been previously registered by a subscriber for subscribing to a pollutant offset program for offsetting in a certified or certifiable manner at least part of the quantity of pollutant(s) emitted by the device under operation.

30. The system of claim 22, wherein said system further comprises at least one sub-system that is configured to check the existence of a subscriber's account that has been previously registered by a subscriber for subscribing to a pollutant offset program for offsetting in a certified or certifiable manner at least part of the quantity of pollutant(s) emitted by a pollutant-emitting device.

31. The system of claim 22, wherein said system further comprises at least one sub-system that is configured to check whether any prepayment procedure has been set up when registering the subscriber's account.

32. The system of claim 22, wherein said system further comprises at least one sub-system (an authentication entity) that is configured to store said information contained in the offset or non-offset status electronic signal for subsequent authenticity check.

33. The system of claim 32, wherein said system further comprises at least one sub-system (an authentication entity) that is configured to compare subsequent information contained in an electronic signal and that is configured to activate said at least one information system (14) with said stored information and checking authenticity of said compared subsequent information.

34. The system of claim 22, wherein said at least one information system is further configured to extract information contained in the received signal, process said extracted information and generate at least one command for activating said at least one information system and transmitting offset incentivization information depending on said information.

35. The system of claim 22, wherein said at least one information system comprises at least one of the following: a communication apparatus that is adapted to communicate information on one or more communication networks, in particular social networks through the Internet; one or more light elements adapted to be illuminated in a predetermined manner; one or more sound elements adapted to generate sound in a predetermined manner; at least one display adapted to display a predetermined message.

36. The system of claim 22, wherein said system further comprises at least one subscribing sub-system, said at least one subscribing sub-system including hardware and/or software specially adapted to process, receive and/or transmit subscription or subscriber information in connection with a pollutant offset program.

37. The system of claim 36, wherein said at least one subscribing sub-system includes at least one transmitting device adapted to transmit said offset status information signal to said at least one information system.

38. The system of claim 22, wherein said system further comprises at least one payment sub-system, said at least one payment sub-system including hardware and/or software specially adapted to process, receive and/or transmit data sufficient to generate a certification that a payment or engagement to pay for offsetting a quantity of GHG (Greenhouse Gas) or other pollutant emitted by operation of the device has been implemented.

39. The system of claim 38, wherein said at least one subscribing sub-system further includes communication elements adapted to transmit and/or receive data or information to and/or from said at least one payment sub-system.

40. The system of claim 38, wherein said system further comprises a communication module associated with said pollutant-emitting device, said communication module being adapted to selectively transmit data or information to said at least one subscribing sub-system and/or said at least one payment sub-system, said selectively transmitted data being representative of subscription or subscriber information in connection with a pollutant offset program.

41. The system of claim 22, wherein said system further comprises a communication module associated with said pollutant-emitting device, wherein said communication module includes hardware and/or software specially adapted to transmit data or information corresponding to selection of an operation mode for operating the device under a pollutant offset mode when the device is operated.

42. The system of claim 22, wherein the at least one pollutant-emitting device is an automobile.

* * * * *